US010169497B2

(12) United States Patent
Saito

(10) Patent No.: US 10,169,497 B2
(45) Date of Patent: Jan. 1, 2019

(54) METHOD AND APPARATUS FOR ANALYSIS OF SHAPE OPTIMIZATION

(71) Applicant: JFE Steel Corporation, Tokyo (JP)

(72) Inventor: Takanobu Saito, Tokyo (JP)

(73) Assignee: JFE Steel Corporation (JP)

( * ) Notice: Subject to any disclaimer, the term of this patent is extended or adjusted under 35 U.S.C. 154(b) by 370 days.

(21) Appl. No.: 14/760,824

(22) PCT Filed: Dec. 18, 2013

(86) PCT No.: PCT/JP2013/083936
§ 371 (c)(1),
(2) Date: Jul. 14, 2015

(87) PCT Pub. No.: WO2014/119167
PCT Pub. Date: Aug. 7, 2014

(65) Prior Publication Data
US 2015/0356237 A1    Dec. 10, 2015

(30) Foreign Application Priority Data
Feb. 1, 2013    (JP) .................................. 2013-018681

(51) Int. Cl.
*G06F 17/50* (2006.01)

(52) U.S. Cl.
CPC .......... *G06F 17/5009* (2013.01); *G06F 17/50* (2013.01); *G06F 17/5095* (2013.01); *G06F 2217/08* (2013.01); *Y02T 10/82* (2013.01)

(58) Field of Classification Search
CPC .. G06F 17/5009; G06F 17/50; G06F 17/5095; G06F 2217/08; Y02T 10/82
See application file for complete search history.

(56) References Cited

U.S. PATENT DOCUMENTS

2006/0259283 A1* 11/2006 Brughmans ......... G06F 17/5018
703/2
2007/0239411 A1* 10/2007 Yamashita .......... G06F 17/5018
703/7

(Continued)

FOREIGN PATENT DOCUMENTS

CN    101504682    8/2009
CN    104769592    7/2015

(Continued)

OTHER PUBLICATIONS

Supplementary European Search Report dated Nov. 22, 2016, of corresponding European Application No. 13873950.3.

(Continued)

*Primary Examiner* — Aniss Chad
*Assistant Examiner* — Chuen-Meei Gan
(74) *Attorney, Agent, or Firm* — DLA Piper LLP (US)

(57) ABSTRACT

A method for analysis of shape optimization includes: a design space setting step of setting a design space; an optimization block model generating step of generating an optimization block mode in the set design space; a connection processing step of connecting the generated optimization block model with a structural body model; a material property setting step of setting a material property for the optimization block model; a crashworthy optimum shaping condition setting step of setting a crashworthy optimum shaping condition for the optimization block model; a crashworthiness analysis condition setting step of setting a crashworthiness analysis condition for the structural body model; a three-dimensional element necessity calculation step of executing a crashworthiness analysis on the optimization block model, and calculating information related to necessity of each of three-dimensional elements of the optimiza- (Continued)

tion block model; and an optimum shape determining step of determining an optimum shape.

34 Claims, 24 Drawing Sheets

(56) References Cited

U.S. PATENT DOCUMENTS

| 2009/0164178 | A1* | 6/2009 | Pydimarry | G06F 17/50 703/1 |
| 2010/0153077 | A1* | 6/2010 | Suresh | G06F 17/5018 703/2 |
| 2010/0262406 | A1* | 10/2010 | Goel | G06F 17/5018 703/2 |
| 2014/0214370 | A1* | 7/2014 | Olhofer | G06F 17/5095 703/1 |
| 2015/0302641 | A1 | 10/2015 | Saito | |

FOREIGN PATENT DOCUMENTS

| JP | 2010-250818 A | 11/2010 |
| JP | 2011-257915 | 12/2011 |
| JP | 2013-25533 A | 2/2013 |
| WO | 2006-/009026 | 1/2006 |

OTHER PUBLICATIONS

Kim, H., et al., "Crashworthiness Design and Evaluation on the Leading-cab Structure of Rolling Stock Using Topology Optimization," *International Journal of Precision Engineering and Manufacturing*, vol. 10, No. 2, Apr. 1, 2009, pp. 79-85.

Chinese Office Action dated Jun. 28, 2017, of corresponding Chinese Application No. 201380071921.0, along with a Search Report in English.

Wu, G., "Optimum Design for Crash Energy Absorption Ability of Car Front Side Member," *Machine Design Research*, vol. 27, No. 4, Aug. 31, 2011.

Yamada, T., "A topology optimization method based on the level set method incorporating a fictitious interface energy," *Computer Methods in Applied Mechanics and Engineering*, vol. 199, No. 45-48, Nov. 15, 2010.

Muller, O. et al., "Topology Optimization of Large Real World Structures", (online), Mar. 3, 2007, pp. 1-14, http://web.archive.org/web/20070303133506/http://www.ipek.uni-karlsruhe.de/medien/veroeffentlichungen/nafems99/nafems_paper.pdf.

Yuge, K. et al., "Design of Structural Members for Crashworthiness Using Three Dimensional Topology Optimization", *Transactions of the Japan Society of Mechanical Engineers* (Series A), Nov. 25, 2003, vol. 69, No. 687, pp. 93-100.

* cited by examiner

VIEWED DIAGONALLY FROM
UPPER FRONT RIGHT

VIEWED DIAGONALLY FROM
UPPER FRONT RIGHT

VIEWED DIAGONALLY FROM
LOWER BACK RIGHT

VIEWED DIAGONALLY FROM UPPER FRONT RIGHT
(SAME DIRECTION AS FIG. 3A)

VIEWED DIAGONALLY FROM LOWER BACK RIGHT
(SAME DIRECTION AS FIG. 3B)

VIEWED DIAGONALLY FROM LOWER BACK LEFT

AUTOMOBILE'S WIDTH DIRECTION

METHOD AND APPARATUS FOR ANALYSIS OF SHAPE OPTIMIZATION

TECHNICAL FIELD

This disclosure relates to a method and an apparatus for analysis of shape optimization of a structural body, which both increase stiffness of a structural body of, for example, an automobile, and realizing weight reduction of an automotive body, or improving crash worthiness thereof and realizing weight reduction thereof "Shape optimization" does not mean finding an optimum shape on the premise of a predetermined shape, for example, a T-shape, by supposing that predetermined shape beforehand, but means finding the most preferred shape satisfying analysis conditions without supposing a predetermined shape.

BACKGROUND

In recent years, weight reduction of full vehicles arising from environmental problems has been advanced, in particular in the automotive industry, and analysis by computer aided engineering (hereinafter, referred to as "computer aided engineering (CAE) analysis") has become an indispensable technique in designing automotive bodies. The CAE analysis has been known to achieve improvement in stiffness and weight reduction by using an optimization technique such as mathematical optimization, sheet thickness optimization, shape optimization, or topology optimization. For example, the optimization technique of the CAE analysis is often used in structural optimization of castings such as engine blocks. Of those optimization techniques of the CAE analysis, topology optimization, in particular, has started to attract attention.

Topology optimization is a method of providing a design space of a certain size, fitting three-dimensional elements in the design space, and leaving a minimum necessary portion of the three-dimensional elements satisfying given conditions, to thereby obtain an optimum shape satisfying the conditions. Therefore, for topology optimization, a method of directly constraining the three-dimensional elements forming the design space and directly adding a load thereon is used. As a technique related to such topology optimization, a method for topology optimization of a component of a complex structural body is disclosed in Japanese Patent Application Publication No. 2010-250818.

Structural bodies of automobiles and the like are configured by using mainly thin sheets, and when a portion of an automotive body formed of such thin sheets is optimized, it is difficult to cause that portion to be independent as a design space and to reflect a load and a constrained state in that design space. Thus, there has been a problem that it is difficult to apply an optimization technique to a part of a structural body. Further, there has also been a problem of how to reflect an optimized shape in a thin sheet structure appropriately even if the optimized shape is found with three-dimensional elements.

The technique disclosed in Japanese Patent Application Publication No. 2010-250818 relates to a method of using mathematical operations and to a physical system for analysis, and does not provide a means to solve the above mentioned problems. In recent years, development of a technique to solve the above mentioned problems has been desired.

It could therefore be helpful to provide a technique that enables application of an optimization technique to a part of a structural body that receives external force, in particular, collision force, and that contributes to optimization of the structural body.

SUMMARY

I thus provide:

A method for analysis of shape optimization in which a computer executes optimization of a portion forming a structural body model by using a two-dimensional element or a three-dimensional element, and includes: a design space setting step of setting, as a design space, a portion to be optimized in the structural body model; an optimization block model generating step of generating, in the set design space, an optimization block model that is formed of three-dimensional elements and that is for performing an analysis processing of optimization; a connection processing step of connecting the generated optimization block model with the structural body model; a material property setting step of setting a material property for the optimization block model; a crashworthy optimum shaping condition setting step of setting a crashworthy optimum shaping condition for the optimization block model, the crashworthy optimum shaping condition being a condition for finding an optimum shape for a crashworthiness; a crashworthiness analysis condition setting step of setting a crashworthiness analysis condition for the structural body model with which the optimization block model has been connected, the crashworthiness analysis condition being a condition for performing a crashworthiness analysis; a three-dimensional element necessity calculation step of executing, based on the set crashworthy optimum shaping condition and the crashworthiness analysis condition, the crashworthiness analysis on the optimization block model, and calculating information related to necessity of each of the three-dimensional elements of the optimization block model for the crashworthiness; and an optimum shape determining step of determining, based on a result of the calculation, an optimum shape for the crashworthiness.

A method for analysis of shape optimization in which a computer executes optimization of a portion forming a structural body model by using a two-dimensional element or a three-dimensional element, and includes: a design space setting step of setting, as a design space, a portion to be optimized in the structural body model; an optimization block model generating step of generating, in the set design space, an optimization block model that is formed of three-dimensional elements and that is for performing an analysis processing of optimization; a connection processing step of connecting the generated optimization block model with the structural body model; a material property setting step of setting a material property for the optimization block model; a stiffness optimum shaping condition setting step of setting a stiffness optimum shaping condition for the optimization block model, the stiffness optimum shaping condition being a condition for finding an optimum shape for a stiffness; a stiffness analysis condition setting step of setting a stiffness analysis condition for the structural body model with which the optimization block model has been connected, the stiffness analysis condition being a condition for performing a stiffness analysis; a three-dimensional element necessity calculation step of executing, based on the set stiffness optimum shaping condition and the stiffness analysis condition, the stiffness analysis on the optimization block model, and calculating information related to necessity of each of the three-dimensional elements of the optimization block model for the stiffness; and an optimum shape determining step of determining, based on a result of the calculation, an optimum shape for the stiffness.

The method for analysis of shape optimization includes: a stiffness optimum shaping condition setting step of setting a stiffness optimum shaping condition for the optimization block model, the stiffness optimum shaping condition being a condition for finding an optimum shape for a stiffness; a stiffness analysis condition setting step of setting a stiffness analysis condition for the structural body model with which the optimization block model has been connected, the stiffness analysis condition being a condition for performing a stiffness analysis; and a three-dimensional element necessity calculation step of executing, based on the set stiffness optimum shaping condition and the stiffness analysis condition, the stiffness analysis on the optimization block model, and calculating information related to necessity of each of the three-dimensional elements of the optimization block model for crashworthiness and the stiffness, wherein the optimum shape determining step determines an optimum shape for the crashworthiness and the stiffness, based on a result of the calculation of the three-dimensional element necessity calculation step in a case where the crashworthiness analysis has been executed and a result of the calculation of the three-dimensional element necessity calculation step in a case where the stiffness analysis has been executed.

The crashworthiness analysis condition setting step sets, as a crashworthiness load, a load obtained by performing a crashworthiness analysis on the structural body model beforehand.

The material property setting step sets, if a part where the optimization block model has been connected with in the structural body model is formed of a two-dimensional element, a Young's modulus of the three-dimensional elements of the optimization block model to a Young's modulus lower than a Young's modulus of the two-dimensional element.

The material property setting step sets, if a part where the optimization block model has been connected with in the structural body model is formed of a two-dimensional element, stress of a stress-strain curve for the three-dimensional elements of the optimization block model to stress lower than stress of a stress-strain curve for the two-dimensional element.

The three-dimensional elements forming the optimization block model is each formed of a three-dimensional element that is a polyhedron having five or more sides and eight or less sides and that has at least one pair of sides parallel to each other.

The optimization block model generating step generates the optimization block model, which is along a peripheral surface where the design space has been set in the structural body model, and in which the three-dimensional elements are subdivided in parallel with a plane having a maximum area of the design space.

The optimization block model is generated by: setting nodes in a connected portion with the two-dimensional elements or the three-dimensional elements forming the structural body model; using, as the three-dimensional elements forming the optimization block model, hexahedral three-dimensional elements; and stacking the three-dimensional elements along a plane including the nodes set in the connected portion.

The optimization block model is formed of a plurality of block bodies formed of three-dimensional elements, and is formed by connecting the plurality of block bodies by using a rigid body element, a beam element, or a two-dimensional element.

Discretization is performed with an optimization parameter in optimization calculation by numerical analysis.

Moreover, an apparatus for analysis of shape optimization performs, by a computer, optimization calculation by numerical analysis of a shape of a portion of a structural body model formed by using a two-dimensional element, or both of the two-dimensional element and a three-dimensional elements, and includes: a design space setting unit that sets, as a design space, a portion to be optimized in a part of the structural body model; an optimization block model generating unit that generates, in the set design space, an optimization block model that is formed of three-dimensional elements and is for performing an analysis processing of optimization; a connection processing unit that performs a processing of connecting the generated optimization block model with the structural body model; a material property setting unit that sets a material property for the optimization block model; a crashworthy optimum shaping condition setting unit that sets a crashworthy optimum shaping condition for the optimization block model, the crashworthy optimum shaping condition being a condition for finding an optimum shape for a crashworthiness; a crashworthiness analysis condition setting unit that sets a crashworthiness analysis condition for the structural body model with which the optimization block model has been connected, the crashworthiness analysis condition being for performing a crashworthiness analysis; a crashworthiness analysis unit that executes, based on the set crashworthy optimum shaping condition and the crashworthiness analysis condition, the crashworthiness analysis on the optimization block model; a three-dimensional element necessity calculating unit that calculates information related to necessity of each of the three dimensional elements of the optimization block model for the crashworthiness when the crashworthiness analysis is performed; and an optimum shape determining unit that determines, based on a result of the calculation, an optimum shape for the crashworthiness.

Moreover, an apparatus for analysis of shape optimization performs, by a computer, optimization calculation by numerical analysis of a shape of a portion of a structural body model formed by using a two-dimensional element, or both of the two-dimensional element and a three-dimensional elements, and includes: a design space setting unit that sets, as a design space, a portion to be optimized in a part of the structural body model; an optimization block model generating unit that generates, in the set design space, an optimization block model that is formed of three-dimensional elements and is for performing an analysis processing of optimization; a connection processing unit that performs a processing of connecting the generated optimization block model with the structural body model; a material property setting unit that sets a material property for the optimization block model; a stiffness optimum shaping condition setting unit that sets a stiffness optimum shaping condition for the optimization block model, the stiffness optimum shaping condition being a condition for finding an optimum shape for a stiffness; a stiffness analysis condition setting unit that sets a stiffness analysis condition for the structural body model with which the optimization block model has been connected, the stiffness analysis condition being a condition for performing a stiffness analysis; a stiffness analysis unit that executes, based on the set stiffness optimum shaping condition and the stiffness analysis condition, the stiffness analysis on the optimization block model; a three-dimensional element necessity calculating unit that calculates information related to necessity of each of the three dimensional elements of the optimization block model for the stiffness when the stiffness analysis is performed; and an optimum shape determining unit that determines, based on a result of the calculation, an optimum shape for the stiffness.

Moreover, the apparatus for analysis of shape optimization in one example for finding an optimum shape for the crashworthiness, includes: a stiffness optimum shaping condition setting unit that sets a stiffness optimum shaping condition for the optimization block model, the stiffness optimum shaping condition being a condition for finding an optimum shape for a stiffness; a stiffness analysis condition setting unit that sets a stiffness analysis condition for the structural body model with which the optimization block model has been connected, the stiffness analysis condition being a condition for performing a stiffness analysis; and a stiffness analysis unit that executes, based on the set stiffness optimum shaping condition and the stiffness analysis condition, the stiffness analysis on the optimization block model, wherein the three-dimensional element necessity calculating unit has a function of calculating information related to necessity of each of the three dimensional elements of the optimization block model for the crashworthiness and the stiffness when the stiffness analysis unit performs the stiffness analysis, and the optimum shape determining unit determines, based on the information related to necessity of each of the three-dimensional elements calculated when the crashworthiness analysis was performed and the information related to necessity of each of the three-dimensional elements calculated when the stiffness analysis was performed, an optimum shape for the crashworthiness and the stiffness.

The crashworthiness analysis condition setting unit sets, as a crashworthiness load, a load obtained by performing crashworthiness analysis on the structural body model beforehand.

The material property setting unit sets, if a part where the optimization block model has been connected with in the structural body model is formed of a two-dimensional element, a Young's modulus of the three-dimensional elements of the optimization block model to a Young's modulus lower than a Young's modulus of the two-dimensional element.

The material property setting unit sets, if a part where the optimization block model has been connected with in the structural body model is formed of a two-dimensional element, stress of a stress-strain curve for the three-dimensional elements of the optimization block model to stress lower than stress of a stress-strain curve for the two-dimensional element.

The apparatus for analysis of shape optimization makes the three-dimensional elements forming the optimization block model be each formed of a three-dimensional element that is a polyhedron having five or more sides and eight or less sides and that has at least one pair of sides parallel to each other.

The optimization block model generating unit generates the optimization block model, which is along a peripheral surface where the design space has been set in the structural body model, and in which the three-dimensional elements are subdivided in parallel with a plane having a maximum area of the design space.

The optimization block model generating unit generates the optimization block model by: setting nodes in a connected portion with the two-dimensional elements or the three-dimensional elements forming the structural body model; using, as the three-dimensional elements forming the optimization block model, hexahedral three-dimensional elements; and stacking the three-dimensional elements along a plane including the nodes set in the connected portion.

The optimization block model generating unit forms the optimization block model with a plurality of blocks formed of three-dimensional elements, and generates the optimization block model by connecting the plurality of blocks by using a rigid body element, a beam element, or a two-dimensional element.

The three-dimensional element necessity calculating unit performs discretization with an optimization parameter in the optimization calculation by the numerical analysis.

The three-dimensional element necessity calculating unit performs the optimization calculation by topology optimization.

I achieve an effect of enabling application of an optimization technique to a part of a structural body, which receives external force such as collision force, achieving optimization of a structure of the structural body such as an automotive body, and thereby realizing weight reduction of the structural body while improving crash worthiness and stiffness of the structural body.

REFERENCE SIGNS LIST

1 Apparatus for Analysis of Shape Optimization
3 Display Device
5 Input Device
7 Memory Storage
9 Working Data Memory
9a Data Storage Area
9b Working Area
11 Arithmetic Processing Unit
13 Structural Body Model
15 Design Space Setting Unit
17 Optimization Block Model Generating Unit
18 Connection Processing Unit
19 Material Property Setting Unit
20 Crashworthy Optimum Shaping Condition Setting Unit
21 Crashworthiness Analysis Condition Setting Unit
22 Crashworthiness Analysis Unit
23 Three-Dimensional Element Necessity Calculating Unit
24 Optimum Shape Determining Unit
25 Design Space
27 Optimization Block Model
27a Upper Block
27b Lower Block
28 Bumper Model
29 Connected Portion
31 Constrained Portion
33 Reference Plane
33a Reference Plane
33b Reference Plane
35 Step
41 Apparatus for Analysis of Shape Optimization
43 Stiffness Optimum Shaping Condition Setting Unit
45 Stiffness Analysis Condition Setting Unit
47 Stiffness Analysis Unit

DETAILED DESCRIPTION

Hereinafter, preferred configurations of a method and an apparatus for analysis of shape optimization will be described in detail, based on the drawings. This disclosure is not limited by these configurations/examples.

First Example

Figure 1:
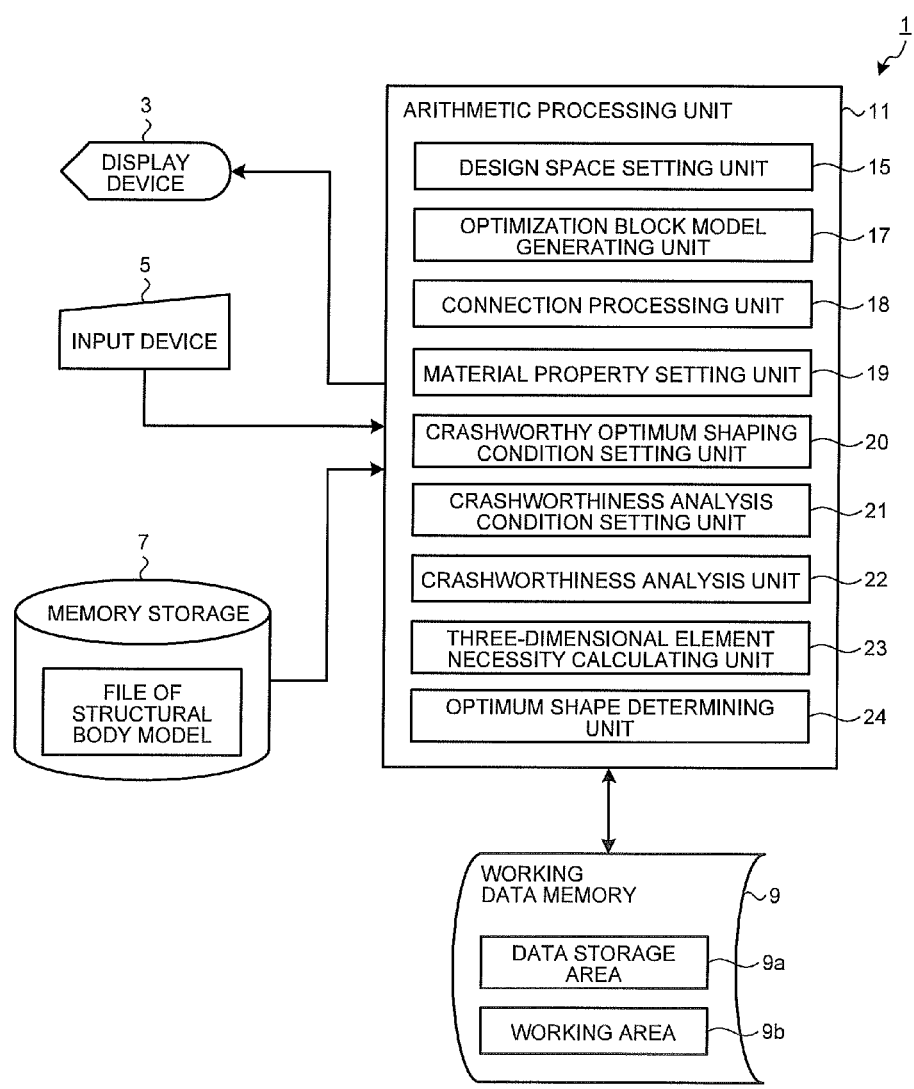
FIG. 1 is a block diagram of an apparatus for analysis of shape optimization according to a first example.
Figure 2:
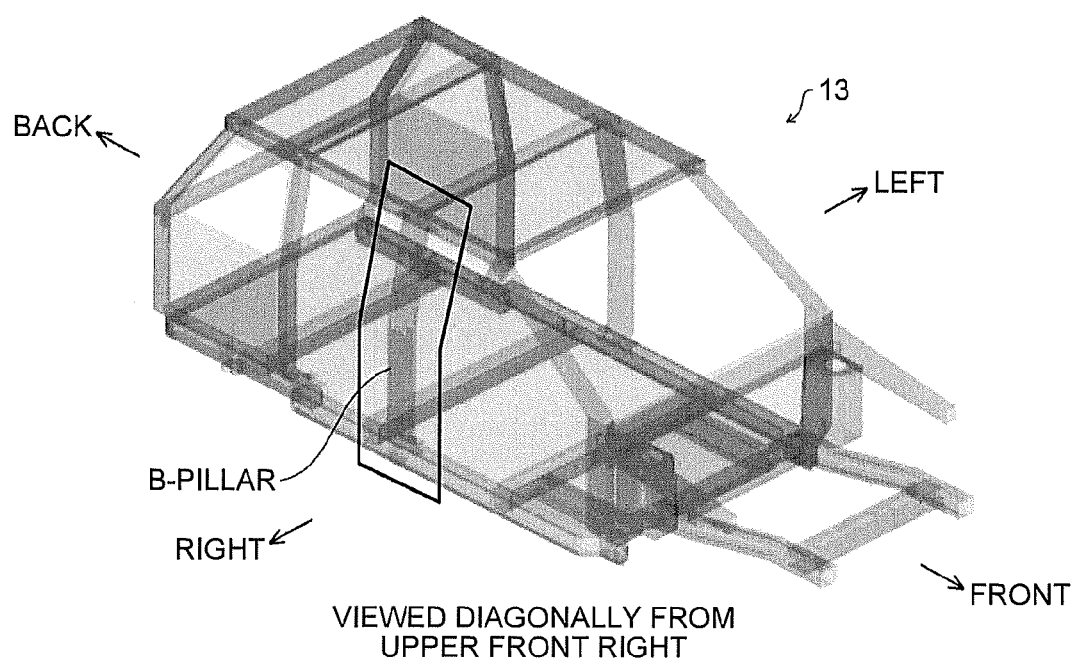
FIG. 2 is an explanatory diagram of an example of a structural body model according to the first example.

In this first example, a shape of a B-pillar of an automotive body is optimized and will be described as an example. As illustrated in FIG. 1, an apparatus for analysis of shape optimization 1 according to this first example is an apparatus that performs optimization calculation by numerical analysis of a shape of a portion of a structural body model 13, of which an example is illustrated in FIG. 2, formed by using a two-dimensional element, or the two-dimensional element and a three-dimensional element. Specifically, the apparatus for analysis of shape optimization 1 is configured of a personal computer (PC), and has a display device 3, an input device 5, a memory storage 7, a working data memory 9, and an arithmetic processing unit 11. Further, the display device 3, the input device 5, the memory storage 7, and the working data memory 9 are connected to the arithmetic processing unit 11. The display device 3, the input device 5, the memory storage 7, and the working data memory 9 perform their respective functions according to commands of the arithmetic processing unit 11.

Display Device

The display device 3 is used in display of results of calculation and the like, and is configured of a liquid crystal monitor or the like.

Input Device

The input device 5 is used in instruction for display of a file of the structural body model 13, input of conditions by an operator, and the like, and is configured of a key board, a mouse, and the like.

Memory Storage

In the memory storage 7, various pieces of information such as at least the file of the structural body model 13 exemplified in FIG. 2, are stored. The structural body model 13 may be configured of only two-dimensional elements, or may be configured of a combination of two-dimensional elements and three-dimensional elements. For example, in an example of an automotive body as illustrated in FIG. 2, which is an example of the structural body model 13, since the automotive body is formed mainly of steel sheets, the structural body model 13 is formed of two-dimensional elements. Further, if the structural body model 13 is a block body formed of a casting such as an engine, for example, the structural body model 13 is formed of three-dimensional elements.

Working Data Memory

The working data memory 9 has, inside thereof, a data storage area 9a storing therein results of calculation, and a working area 9b for performing calculation processing.

Arithmetic Processing Unit

Figure 3A:
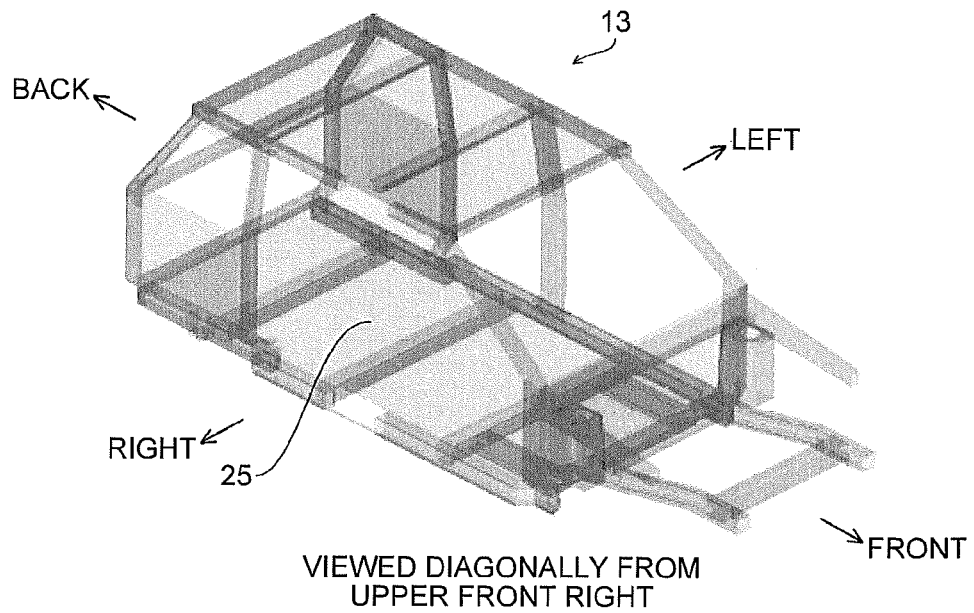
FIG. 3A is an explanatory diagram of a state where a design space has been set in the structural body model according to the first example.
Figure 3B:
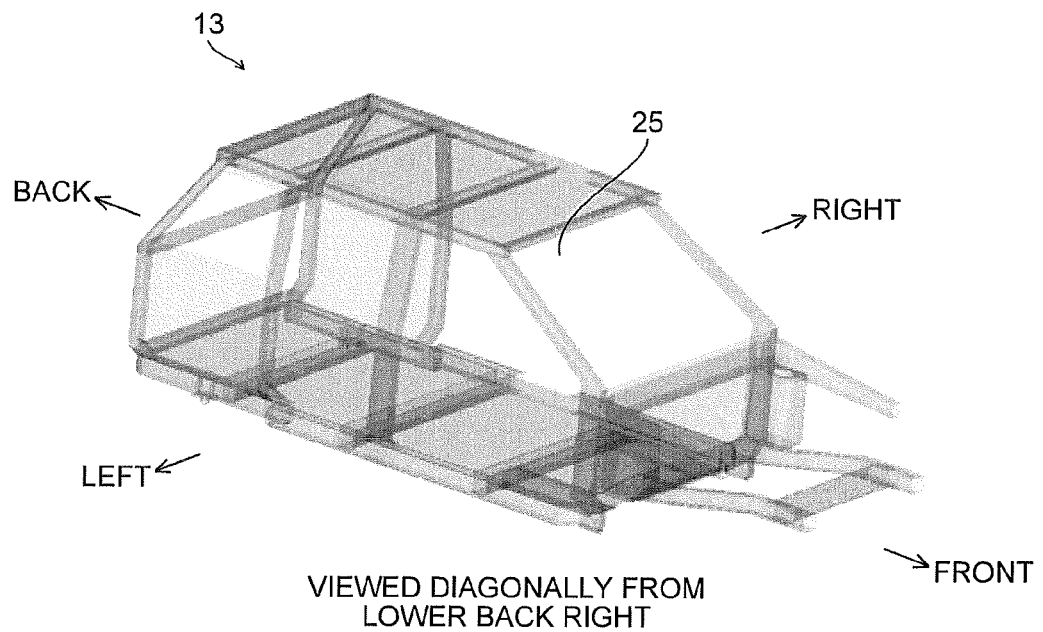
FIG. 3B is a view of the design space illustrated in FIG. 3A as viewed from a different angle.

The arithmetic processing unit 11 is configured of a central processing unit (CPU) of a personal computer (PC). Each unit of the arithmetic processing unit 11 described below is realized by the CPU executing a predetermined program. The arithmetic processing unit 11 is characterized in that the arithmetic processing unit 11 includes: a design space setting unit 15 that sets, as a design space 25, a portion to be optimized, of which an example is illustrated in FIGS. 3A and 3B, in a part of the structural body model 13; an optimization block model generating unit 17 that generates, in the set design space 25, an optimization block model 27 (see, for example, FIG. 4), which is formed of three-dimensional elements and is to be subjected to an analysis processing of optimization; a connection processing unit 18 that performs processing of connecting the generated optimization block model 27 with the structural body model 13; a material property setting unit 19 that sets a material property for the optimization block model 27; a crashworthy optimum shaping condition setting unit 20 that sets a condition (referred to as "crashworthy optimum shaping condition") for the structural body model 13, the condition being for finding an optimum shape for a crashworthiness; a crashworthiness analysis condition setting unit 21 that sets a condition (referred to as "crashworthiness analysis condition") for the optimization block model 27 (see FIG. 4) connected to the structural body model 13, the condition being performing a crashworthiness analysis; a crashworthiness analysis unit 22 that executes, based on the set crashworthy optimum shaping condition and the crashworthiness analysis condition, the crashworthiness analysis on the optimization block model 27; a three-dimensional element necessity calculating unit 23 that calculates information related to necessity of each three-dimensional element for the crashworthiness of the optimization block model 27 when the crashworthiness analysis is performed; and an optimum shape determining unit 24 that determines, based on a result of the calculation, an optimum shape for the crashworthiness. Hereinafter, a configuration of each of these units of the arithmetic processing unit 11 will be described in detail.

Design Space Setting Unit

The design space setting unit 15, sets, as the design space 25, a portion to be optimized, in a part of the structural body model 13. In the structural body model 13 illustrated in FIG. 2, a portion around a B-pillar part on a right side of an automotive body is illustrated. In this example, this portion is the portion to be optimized. In this first example, the design space setting unit 15 sets the design space 25 in that portion of the structural body model 13, which specifically is the B-pillar portion illustrated in FIG. 2. When the design space 25 has been set in a part of the structural body model 13 by the design space setting unit 15, as illustrated in FIGS. 3A and 3B, the portion of the structural body model 13 in that part is deleted and the deleted portion becomes the design space 25. FIG. 3B illustrates a state where the design space 25 has been set, as viewed from an angle different from that in FIG. 3A.

The above described example is when the design space setting unit 15 sets the design space 25 by deleting a portion of the structural body model 13, but the apparatus for analysis of shape optimization 1 may be configured to set the design space 25 beforehand when the structural body model 13 is generated. If the design space 25 is set beforehand upon generation of the structural body model 13, a generating unit itself that generates the structural body model 13 serves also as the design space setting unit 15. That is, the design space setting unit 15 may have both of the above described function of setting the design space and the function of generating the structural body model 13.

Optimization Block Model Generating Unit

Figure 4:
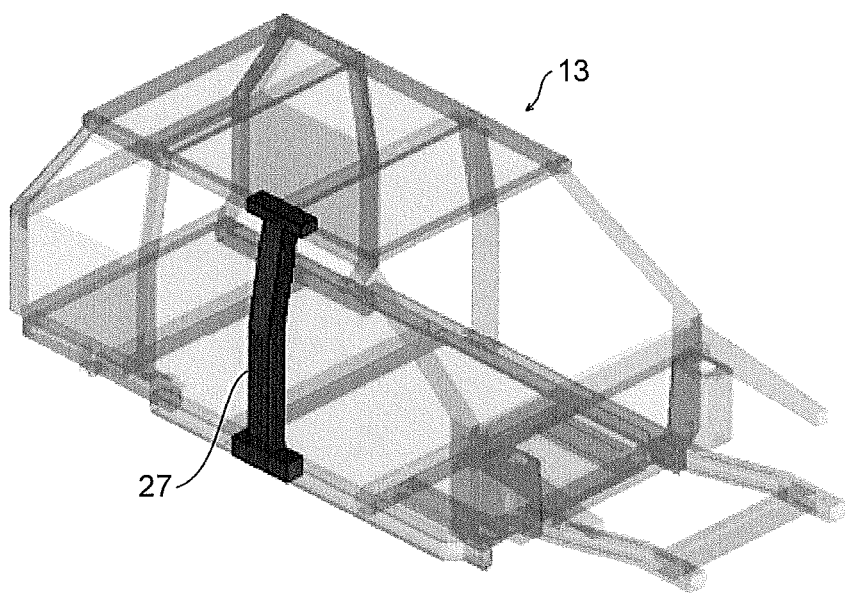
FIG. 4 is an explanatory diagram of a state where an optimization block model has been fitted in the design space set in the structural body model according to the first example.

The optimization block model generating unit 17 generates the optimization block model 27 to be subjected to analysis processing of optimization in the design space 25 set by the design space setting unit 15, as illustrated in FIG. 4. Upon generation, the optimization block model generating unit 17 may generate the optimization block model 27 in any shape of a size that fits in the design space 25 set in the portion of the structural body model 13, as illustrated in FIGS. 3A and 3B.

Further, the optimization block model generating unit 17 forms the optimization block model 27 with three-dimensional elements. Upon the formation, the optimization block model generating unit 17 preferably forms the three-dimensional elements, each with a three-dimensional element, which is a polyhedron having five sides or more and eight sides or less and which has at least one pair of sides parallel to each other. Reasons for this are as follows. If a part formed in the design space 25 is formed of a thin sheet like a part of an automotive body, an optimum shape of the optimization block model 27 is desirably calculated to be reflected in a structural body shape of the thin sheet, by executing calculation of optimization using the optimization block model 27. In this respect, by forming the optimization block model 27 by using the three-dimensional elements, each of which is a polyhedron having five sides or more and eight sides or less and which has at least one pair of sides parallel to each other, such a demand becomes easier to be satisfied. Further, as the three-dimensional elements that form the optimization block model 27 and that are polyhedrons each having five sides or more, three-dimensional elements of a uniform size are preferably set to thereby increase accuracy of optimization.

Figure 5A:
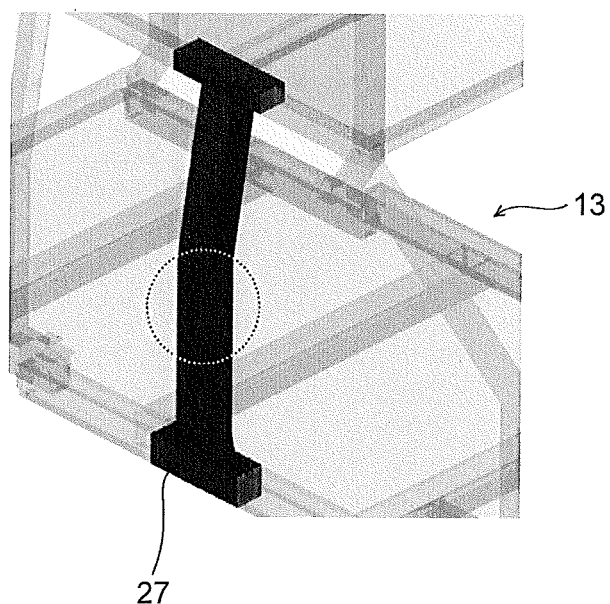
FIG. 5A is an explanatory diagram illustrating an example of the optimization block model according to the first example.
Figure 5B:
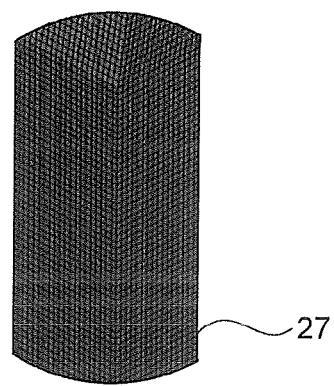
FIG. 5B is an enlarged view of a portion surrounded by a circle on the optimization block model illustrated in FIG. 5A.

FIG. 4 illustrates the optimization block model 27 generated in an I-shape, which is an example. Further, the three-dimensional elements used to form the optimization block model 27 in this example are hexahedrons, as illustrated in FIGS. 5A and 5B. FIG. 5B is an enlarged view of a circled portion of the optimization block model 27 illustrated in FIG. 5A.

Figure 6:
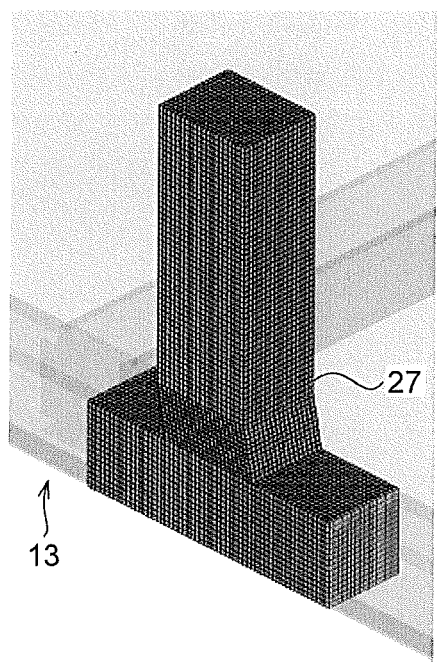
FIG. 6 is an explanatory diagram illustrating appearance of inside of the optimization block model illustrated in FIG. 5A.

FIG. 6 illustrates appearance of inside of the optimization block model 27 illustrated in FIG. 5A at around a quarter of its height. As illustrated in FIG. 6, sizes of elements inside the optimization block model 27 are matched with sizes of elements at a surface of the optimization block model 27. As a result, the sizes of the respective elements are uniform over the entire optimization block model 27. By uniformizing the element size finely as described above, accurate analysis is able to be achieved.

Further, the optimization block model generating unit 17 preferably generates the optimization block model 27, along a peripheral surface where the design space 25 has been set in the structural body model 13, and such that the three-dimensional elements are subdivided in parallel with a plane having the maximum area of the design space. For example, as illustrated in FIGS. 3A and 3B, if the B-pillar in the automotive body has been set as the design space 25, the optimization block model generating unit 17 generates, as illustrated in FIG. 4, the optimization block model 27 having the I-shape. A surface on the automobile's outer side of this optimization block model 27 has the largest area. The optimization block model generating unit 17 generates the optimization block model 27 such that the surface having this maximum area becomes parallel to a lateral surface of the automotive body.

Reasons for generating the optimization block model 27 as described above are as follows. Since the B-pillar of the automotive body is formed of sheets, for example, a calculation result in which the three-dimensional elements of the optimization block model 27 remain in a planar shape is desirably obtained when calculation of optimization is executed by using the optimization block model 27. By adopting the above described model configuration for the optimization block model 27, possibility of this result of calculation remaining in a planar shape is increased and thus utility value for practical use thereof is increased.

Connection Processing Unit

Figure 7A:
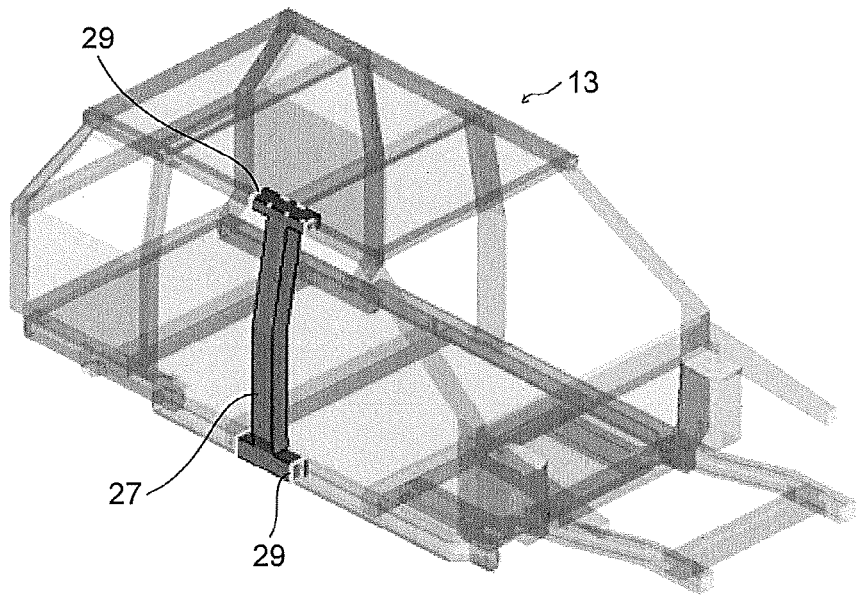
FIG. 7A is an explanatory diagram of a state where the optimization block model that had been fitted in the structural body model according to the first example has been connected with the structural body model.
Figure 7B:
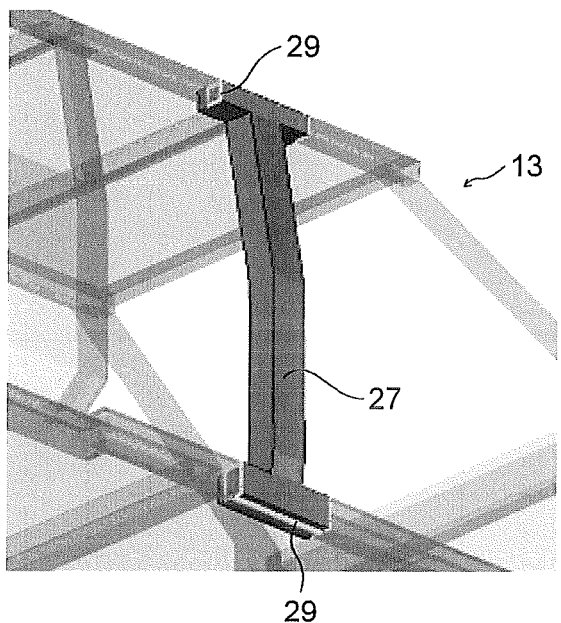
FIG. 7B is a view of the connected state between the optimization block model and structural body model illustrated in FIG. 7A as viewed from a different angle.

The connection processing unit 18 performs processing of connecting the generated optimization block model 27 with a structural body that is another portion of the automotive body, that is, a portion of the structural body model 13, the portion being other than the optimization block model 27. In this processing of connecting the optimization block model 27 and the structural body together, the connection processing unit 18 uses a rigid body element, a sheet element, or a beam element. Upon this processing, the connection processing unit 18 preferably performs connection processing to reflect an original connected position between the portion deleted as the design space 25 and the structural body model 13 (automotive body), in a connected position between the optimization block model 27 and the above mentioned structural body, to accurately transmit a load from the structural body model 13 (automotive body) to the optimization block model 27. FIGS. 7A and 7B are diagrams illustrating a state where the connection processing between the optimization block model and the structural body model has been performed according to the first example. FIG. 7B is a view of the connected state between the optimization block model and the structural body model illustrated in FIG. 7A from a different angle. FIG. 7B illustrates, with white lines, a connected portion 29 between the optimization block model 27 and the structural body model 13 that have been connected together by the connection processing unit 18.

Material Property Setting Unit

The material property setting unit 19 sets a material property such as a Young's modulus, a specific gravity, or a stress-strain curve representing yield strength and tensile strength, for the optimization block model 27. Three-dimensional elements are more difficult to be deformed than two-dimensional elements against a collision. Thus, if a model to be analyzed is formed by connecting three-dimensional elements and two-dimensional elements together, a part formed of the two-dimensional elements may be largely deformed, leading to a result of analysis different from the actual state. For example, if a connected part between the optimization block model 27 and the structural body model 13 is formed of a two-dimensional element, when a crashworthiness load is applied to the optimization block model 27, the position of the connected part is deformed more largely than the optimization block model 27 contrary to the actual state. To solve such a problem, if the part where the optimization block model 27 has been connected to in the structural body model 13 is formed of a two-dimensional element as described above, the material property setting unit 19 sets a Young's modulus of the three-dimensional elements of the optimization block model 27 to a Young's modulus lower than (for example, to be equal to or less than a half of) a Young's modulus of the two-dimensional element of this connected part. As a result, analysis that has no bias in deformation and that is well-balanced is able to be performed. Further, if the connected part between the structural body model 13 and the optimization block model 27 is formed of a two-dimensional element as described above, the material property setting unit 19 may set stress of a stress-strain curve of the three-dimensional elements of the optimization block model 27 to stress lower than stress of a stress-strain curve of the two-dimensional element of this connected part. As a result of this also, analysis that has no bias in deformation and that is well-balanced is able to be performed.

Crashworthy Optimum Shaping Condition Setting Unit

The crashworthy optimum shaping condition setting unit 20 sets crashworthy optimum shaping conditions to find an optimum shape for the crashworthiness, for the optimization block model 27. There are two types of the crashworthy optimum shaping conditions set by this crashworthy optimum shaping condition setting unit 20, which are objective conditions and constraint conditions. The objective condition is a condition set according to an object of the structural body model 13. Examples of this objective condition include minimizing strain energy, minimizing generated stress, and maximizing absorbed energy. The crashworthy optimum shaping condition setting unit 20 sets only one objective condition for the optimization block model 27. The constraint condition is a constraint imposed upon optimization analysis. Examples of the constraint condition include a material volume fraction, which is a volume ratio of the optimization block model 27 after optimization with respect to a volume of the optimization block model 27 before the optimization, and displacement of an arbitrary portion. The crashworthy optimum shaping condition setting unit 20 is able to set a plurality of constraint conditions for the optimization block model 27.

Crashworthiness Analysis Condition Setting Unit

Figure 8:
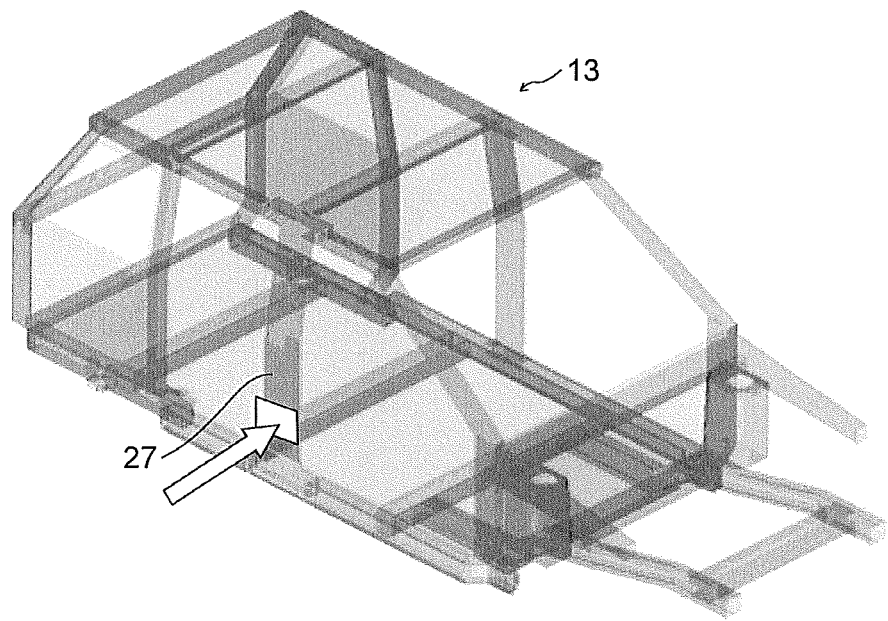
FIG. 8 is an explanatory diagram illustrating a load constraint condition, which is a crashworthiness analysis condition according to the first example.
Figure 9:
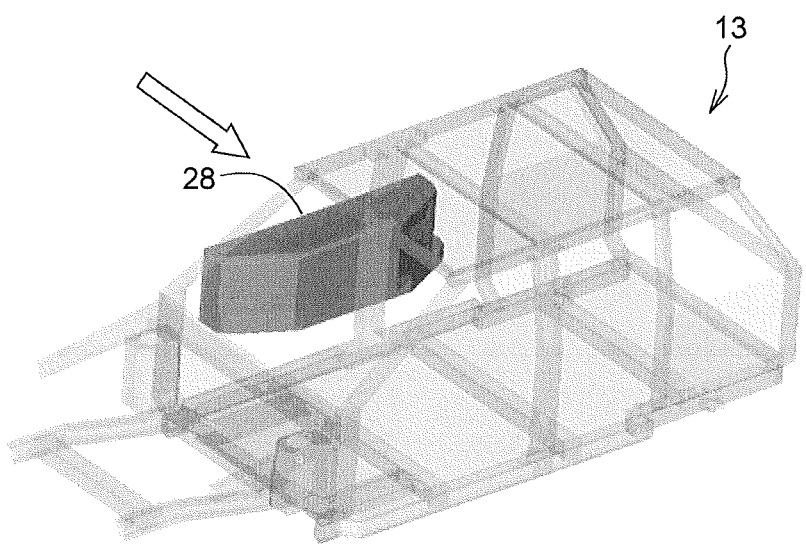
FIG. 9 is an explanatory diagram illustrating a collision object and a collided position, which are crashworthiness analysis conditions according to the first example.

The crashworthiness analysis condition setting unit 21 sets crashworthiness analysis conditions to perform the crashworthiness analysis on the structural body model 13 that has been connected to the optimization block model 27, the crashworthiness analysis conditions being a constrained position of the structural body model 13, a position to which the crashworthiness load is applied, and the like. For example, if an analysis is performed when a bumper of another automobile collides with the B-pillar of the automotive body from the lateral side of the automotive body, the crashworthiness analysis condition setting unit 21 generates, as illustrated in FIG. 9, a bumper model 28 corresponding to the bumper of the other automobile. Subsequently, the crashworthiness analysis condition setting unit 21 sets a condition to cause this generated bumper model 28 to collide, in a direction indicated with a white arrow in FIG. 8, at a predetermined position of the optimization block model 27 (B-pillar) in a state of being fitted in the structural body model 13, for example, at a position indicated with a white rectangle in FIG. 8 (see FIG. 9). In this case, the crashworthiness analysis condition setting unit 21 sets the structural body model 13 to be not constrained. The crashworthiness analysis condition setting unit 21 may be configured to perform crashworthiness analysis on the structural body model 13 beforehand and to set a load obtained as a result of the crashworthiness analysis as a crashworthiness load.

Crashworthiness Analysis Unit

The crashworthiness analysis unit 22 executes, based on the crashworthy optimum shaping conditions and the crashworthiness analysis conditions set as described above, the crashworthiness analysis on the optimization block model 27. In this crashworthiness analysis, the crashworthiness analysis unit 22 uses the inertia relief method or dynamic explicit method. The inertia relief method is static analysis performed on something with the inertia force and the external load being balanced such as a structure floating in the air or a structure floating on the water. The dynamic explicit method is dynamic analysis performed by using a method of determining a physical quantity after passage of a predetermined time period based on a known physical quantity. Therefore, as the crashworthiness analysis unit 22, commercially available analysis software using finite elements, for example, may be used.

Three-Dimensional Element Necessity Calculating Unit

The three-dimensional element necessity calculating unit 23 calculates information related to necessity of each three-dimensional element in the optimization block model 27 when the crashworthiness analysis unit 22 performs the crashworthiness analysis. Examples of the information related to necessity of the respective three-dimensional elements include element densities of the respective three-dimensional elements. The three-dimensional element necessity calculating unit 23 calculates and sets the element densities of the respective three-dimensional elements of the optimization block model 27 to be 1.0 to 0.0. If the element density of a three-dimensional element is 1.0 for example, it means that the whole of this three-dimensional element is a material (necessary for the objective condition), and if the element density is 0.0, it means that a portion corresponding to this three-dimensional element is vacant (unnecessary). By the three-dimensional element necessity calculating unit 23 executing the above described calculation process, information (for example, the element density of equal to or greater than 0.6) meaning "necessary" is calculated for three-dimensional elements satisfying given crashworthy optimum shaping conditions, these three dimensional elements being from the respective three-dimensional elements of the optimization block model 27.

The three-dimensional element necessity calculating unit 23 preferably performs discretization of an optimization parameter in optimization calculation by numerical analysis for a shape of a portion of the structural body model 13. Preferably, a penalty coefficient in this discretization is equal to or greater than "2", or limitation is made to three to twenty times the size of the three-dimensional element that becomes a reference. By performing discretization of the optimization parameter, the optimization parameter is able to be reflected in the structural body shape of the thin sheet. Further, the three-dimensional element necessity calculating unit 23 may perform optimization calculation by topology optimization, that is, topology optimization processing, or optimization processing by any other calculation method, as optimization calculation by numerical analysis of a shape of a portion of the structural body model 13. Thus, commercially available analysis software using finite elements is able to be used as the three-dimensional element necessity calculating unit 23, for example.

Optimum Shape Determining Unit

The optimum shape determining unit 24 determines, based on a result of calculation by the three-dimensional element necessity calculating unit 23, an optimum shape for the crashworthiness. Specifically, the optimum shape determining unit 24 deletes, from the respective three-dimensional elements of the optimization block model 27 generated as described above, three dimensional elements (for example, three dimensional elements having an element density of less than 0.6) not satisfying the given crashworthy optimum shaping conditions, for example. By doing this, the optimum shape determining unit 24 leaves a shape of the optimization block model 27 formed only of the three-dimensional elements (for example, having an element density of equal to or greater than 0.6) satisfying the given crashworthy optimum shaping conditions, as its optimum shape. The optimum shape determining unit 24 may perform smoothing on the optimum shape thus obtained. By the optimum shape determining unit 24 executing such optimization analysis processing, of the three-dimensional elements of the optimization block model 27, the three-dimensional elements that form an optimum shape satisfying the given analysis conditions remain.

It should be noted that a load is transmitted from the structural body model 13 to the optimization block model 27 via the connected portion 29. That is, by the load being transmitted from the structural body model 13 to the optimization block model 27, in the process of the optimization calculation, the optimization block model 27 is deformed and the direction of the load and the like are changed. When the direction of the load and the like are changed, load conditions such as the directions of the load are reflected in the optimization calculation such that an optimum shape is finally given.

Figure 10A:
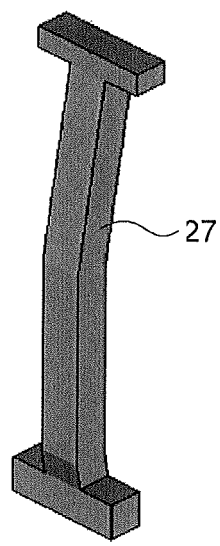
FIG. 10A is an explanatory diagram illustrating an optimization block model alone, which is a comparative example with respect to the first example.
Figure 10B:
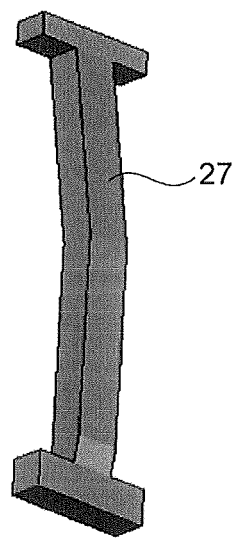
FIG. 10B is a view of the optimization block model alone illustrated in FIG. 10A as viewed from a different angle.
Figure 11A:
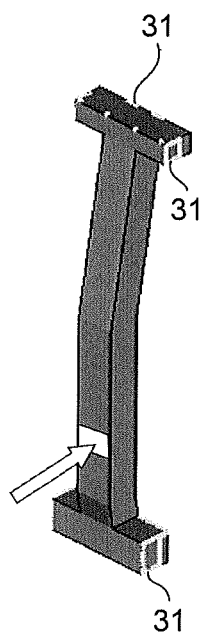
FIG. 11A is an explanatory diagram illustrating a constraint condition of the optimization block model alone in the comparative example with respect to the first example.
Figure 11B:
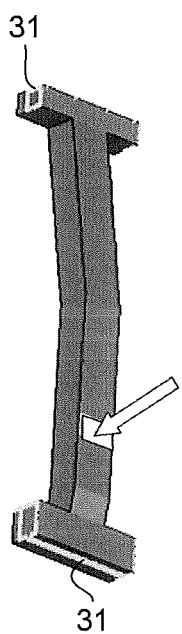
FIG. 11B is a view of the constrained state of the optimization block model alone illustrated in FIG. 11A as viewed from a different angle.

This point will be described in detail by illustration of a comparative example. FIGS. 10A and 10B illustrate the I-shaped optimization block model 27 illustrated in FIG. 4 as a lone model, instead of being fitted in the design space 25 of the structural body model 13. FIG. 10B is a view of the lone optimization block model illustrated in FIG. 10A as viewed from a different angle. FIGS. 11A and 11B illustrate a constrained portion 31, which is a portion where a constraint condition has been set at the same position as the connected portion 29 illustrated in FIGS. 7A and 7B, with respect to the lone optimization block model 27 illustrated in FIGS. 10A and 10B. FIG. 11B is a view of the constrained state of the lone optimization block model illustrated in FIG. 11A as viewed from a different angle. FIG. 11A corresponds to FIG. 10A and FIG. 11B corresponds to FIG. 10B. By constraining the constrained portion 31 illustrated in FIGS. 11A and 11B, analysis of optimization processing was performed with the same analysis conditions as when the fitting into the structural body model 13 was performed as described above.

As a result, optimum shapes found for the optimization block model 27 were entirely different from each other between the comparative example in which optimization processing was performed by taking the optimization block model 27 out alone and the first example in which optimization processing was performed by fitting the optimization block model 27 into the structural body model 13. Such different shapes result in different improvements in their crash performance, for example. Therefore, connecting the optimization block model 27 with the structural body model 13 enables a practically usable optimum shape to be found not only by simply constraining the optimization block model 27, but also by transmitting a load between the structural body model 13 and the optimization block model 27 via the connected portion 29. This point will be described in detail in later described examples.

Figure 12:
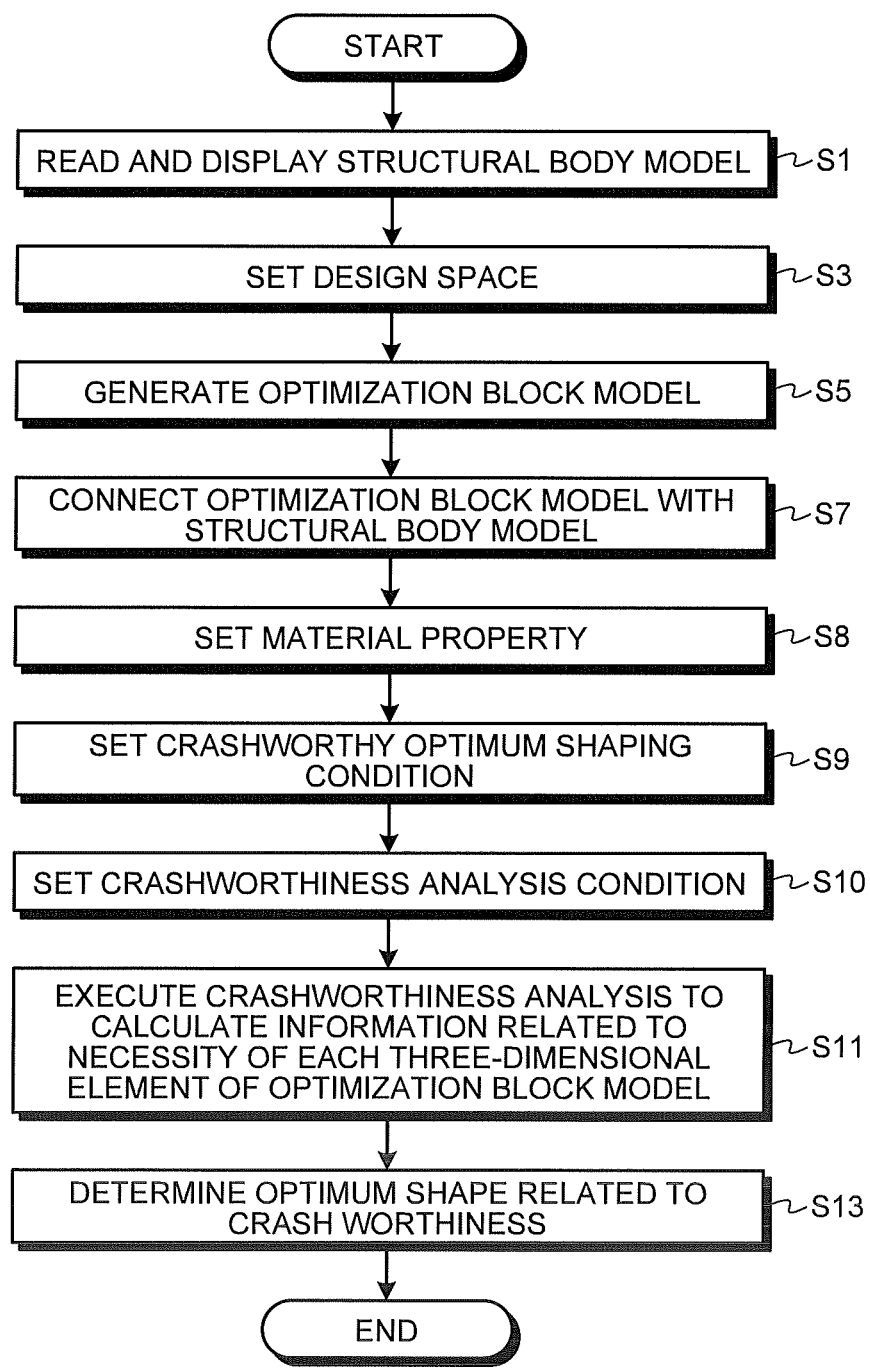
FIG. 12 is a flow chart illustrating a flow of processing by the apparatus for analysis of shape optimization according to the first example.

Next, the flow of a process to actually execute an analysis by using the apparatus for analysis of shape optimization 1 configured as described above will be described based on a flow chart illustrated in FIG. 12. The process described below is realized by an operator instructing a computer via the input device 5 to thereby cause each of the functional units (the design space setting unit 15, the optimization block model generating unit 17, the connection processing unit 18, the material property setting unit 19, the crashworthy optimum shaping condition setting unit 20, the crashworthiness analysis condition setting unit 21, the crashworthiness analysis unit 22, the three-dimensional element necessity calculating unit 23, and the optimum shape determining unit 24) of the arithmetic processing unit 11 in the computer to execute as appropriate each of the above described processes.

By input of operator instructions, through the input device 5, a file of the structural body model 13 to be read out, the computer reads the structural body model 13 from the memory storage 7 to be displayed on the display device 3 (S1). Next, the operator sets the design space 25 to be subjected to optimization processing, in the displayed structural body model 13. Specifically, the operator specifies, by performing an input operation on the input device 5, coordinates of a part to be the design space 25 in the structural body model 13, and instructs an element of that part to be deleted. By this instruction, the design space setting unit 15 of the computer performs a process of deleting the element of the part to set the design space 25 (S3).

When the design space 25 has been set, the operator instructs the optimization block model generating unit 17 to generate the optimization block model 27 of a size that fits in the design space 25. This instruction includes an instruction on which plane in the design space 25 the optimization block model 27 is to be generated based on. For example, if the optimization block model 27 illustrated in FIGS. 4 and 5A is to be generated in the design space 25 of the structural body model 13 illustrated in FIGS. 3A and 3B, when an instruction to generate the optimization block model 27 with reference to a plane in a front-back direction of the optimization block model 27 is given, the optimization block model generating unit 17 of the computer generates the optimization block model 27 that is meshed by pushing out that plane in the front-back direction of the automotive body (S5).

When the optimization block model 27 is generated, the operator instructs the optimization block model 27 to connect to the structural body model 13. This instruction includes which element of a rigid body element, a sheet element, or a beam element is to be used as a connection element. Upon receipt of the instruction, the connection processing unit 18 of the computer performs processing of connecting the optimization block model 27 with the structural body model 13 (S7).

When the above described connection processing is completed, the operator sets a material property of the optimization block model 27 (S8). Upon setting, the operator performs an input operation on the input device 5 and inputs the material property such as a Young's modulus, a specific gravity, or a stress-strain property representing yield strength and tensile strength. The material property setting unit 19 of the computer sets the input material property for the optimization block model 27 that has been connected with the structural body model 13 as described above. Thereafter, the operator sets crashworthy optimum shaping conditions (S9). Upon this setting, the operator performs an input operation on the input device 5 and inputs, as the crashworthy optimum shaping conditions, an objective condition such as minimizing strain energy or maximizing absorbed energy and a constraint condition such as a material volume fraction, as described above. The crashworthy optimum shaping condition setting unit 20 of the computer sets these input crashworthy optimum shaping conditions for the optimization block model 27.

Next, the operator sets the crashworthiness analysis conditions such as a collision object to be collided with the optimization block model 27 (for example, the bumper model 28 of another automobile as illustrated in FIG. 9) and a position to apply a crashworthiness load (S10). Upon this setting, the operator performs an input operation on the input device 5 and inputs the above described crashworthiness analysis conditions. The crashworthiness analysis condition setting unit 21 of the computer sets these input crashworthiness analysis conditions for the structural body model 13, to which the optimization block model 27 has been connected as described above.

Next, the crashworthiness analysis unit 22 and three-dimensional element necessity calculating unit 23 of the computer execute, based on the set crashworthy optimum shaping conditions and the crashworthiness analysis conditions, the crashworthiness analysis on the optimization block model 27, and finds information related to necessity of each three-dimensional element in the optimization block model 27 by calculation (S11). That is, the crashworthiness analysis unit 22 of the computer executes the above described crashworthiness analysis on the optimization block model 27. The three-dimensional element necessity calculating unit 23 of the computer calculates information related to necessity of each three-dimensional element in the optimization block model 27 upon this crashworthiness analysis. Subsequently, the optimum shape determining unit 24 of the computer determines, based on the information related to the necessity found as described above, an optimum shape of the optimization block model 27 for the crashworthiness (S13).

The operator generates a shape model obtained by the optimization calculation or the like and checks, based on that model, stiffness by other structural analysis calculation.

As described above, according to this first example, since a part to be optimized in the structural body model 13 is set as the design space 25, the optimization block model 27 is generated in the set design space 25, and the crashworthiness analysis is executed by connecting the optimization block model 27 with the structural body model 13, load transmission from the connected portion 29 with the structural body model 13 to the optimization block model 27 is appropriately achieved and an optimum shape of the optimization block model 27 is able to be calculated accurately. As a result, optimization of an automotive body structure, for example, is enabled, crash worthiness thereof is able to be improved, and weight reduction of a structural body such as an automotive body, is able to be realized, while maintaining crash performance of the structural body.

Figure 13A:
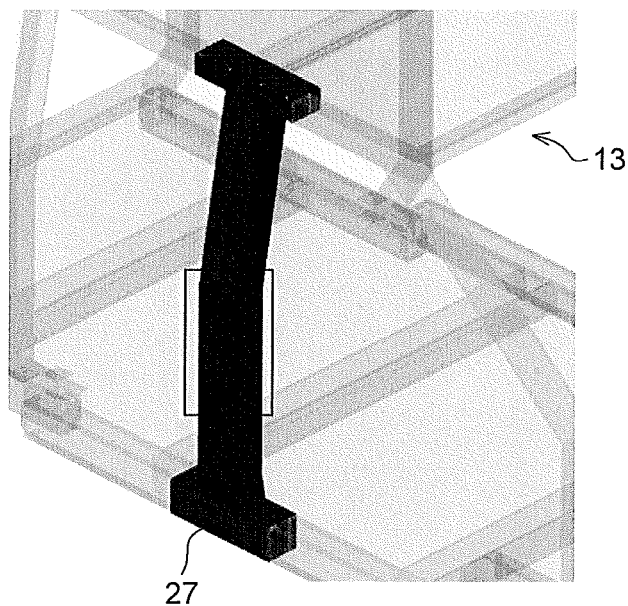
FIG. 13A is an explanatory diagram illustrating another mode of the optimization block model according to the first example.
Figure 13B:
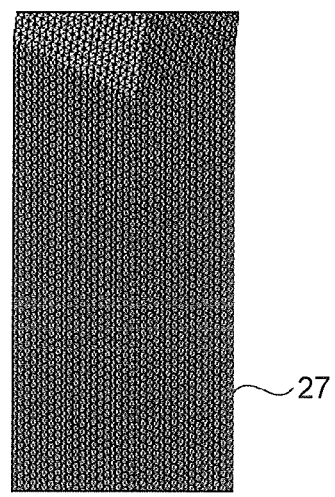
FIG. 13B is an enlarged view of a portion surrounded by a rectangle on the optimization block model illustrated in FIG. 13A.

In the above description, hexahedrons as illustrated in FIGS. 5A and 5B have been exemplified as the three-dimensional elements forming the optimization block model 27, and it has been described that the optimization block model 27 is preferably formed of three-dimensional elements, which are polyhedrons each having five or more sides and eight or less sides and which have at least one pair of sides parallel to each other, as other three-dimensional elements. However, this disclosure does not exclude a case where a tetrahedron as illustrated in FIGS. 13A and 13B is used as a three-dimensional element forming the optimization block model 27. FIGS. 13A and 13B are explanatory diagrams illustrating another mode of the optimization block model according to the first example. FIG. 13A is a diagram illustrating an example of the other mode of the optimization block model according to the first example. FIG. 13B is an enlarged view illustrating a portion surrounded by a rectangle on the optimization block model illustrated in FIG. 13A with the portion being enlarged. If a tetrahedral element is used as a three-dimensional element forming the optimization block model 27 as illustrated in FIGS. 13A and 13B, model generation is possible by generating only an external form of the design space 25 and automatically filling in the inside thereof. However, since the shape of the three-dimensional element becomes a shape having a sharp point at a part where tips of three sides formed of triangles are adjacent to one another, there is a problem that the optimization block model 27 is difficult to be reflected in the structural body of the thin sheet.

Figure 14A:
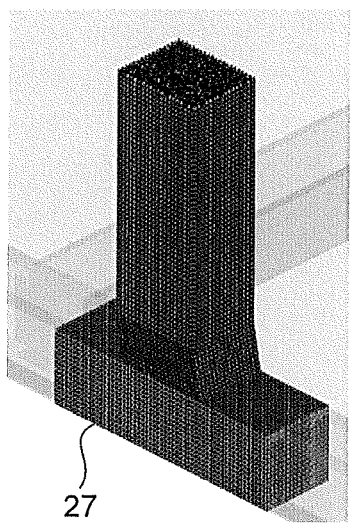
FIG. 14A is an explanatory diagram illustrating appearance of inside of another mode of the optimization block model according to the first example.
Figure 14B:
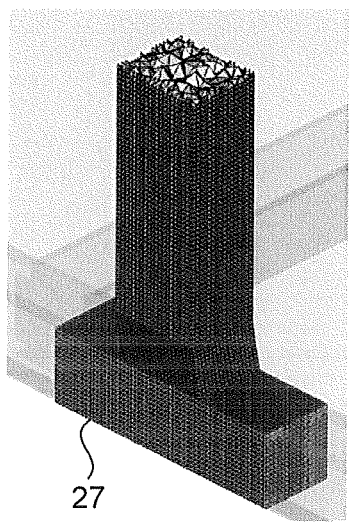
FIG. 14B is an explanatory diagram illustrating appearance of inside of yet another mode of the optimization block model according to the first example.

FIGS. 14A and 14B illustrate appearance of inside of the optimization block model 27 formed of tetrahedral elements at around a quarter of a height thereof. FIG. 14A illustrates appearance of inside of the optimization block model 27 generated such that the element sizes over the entire optimization block model 27 become uniform by matching the inside element size with the surface element size. By making the overall element size fine according to the surface element size, accurate analysis is able to be performed. The sizes of the elements forming the optimization block model 27 may not be uniform as described above. For example, as illustrated in FIG. 14B, the optimization block model 27 may be generated such that the element size gradually becomes larger from the surface to the inside.

Figure 15:
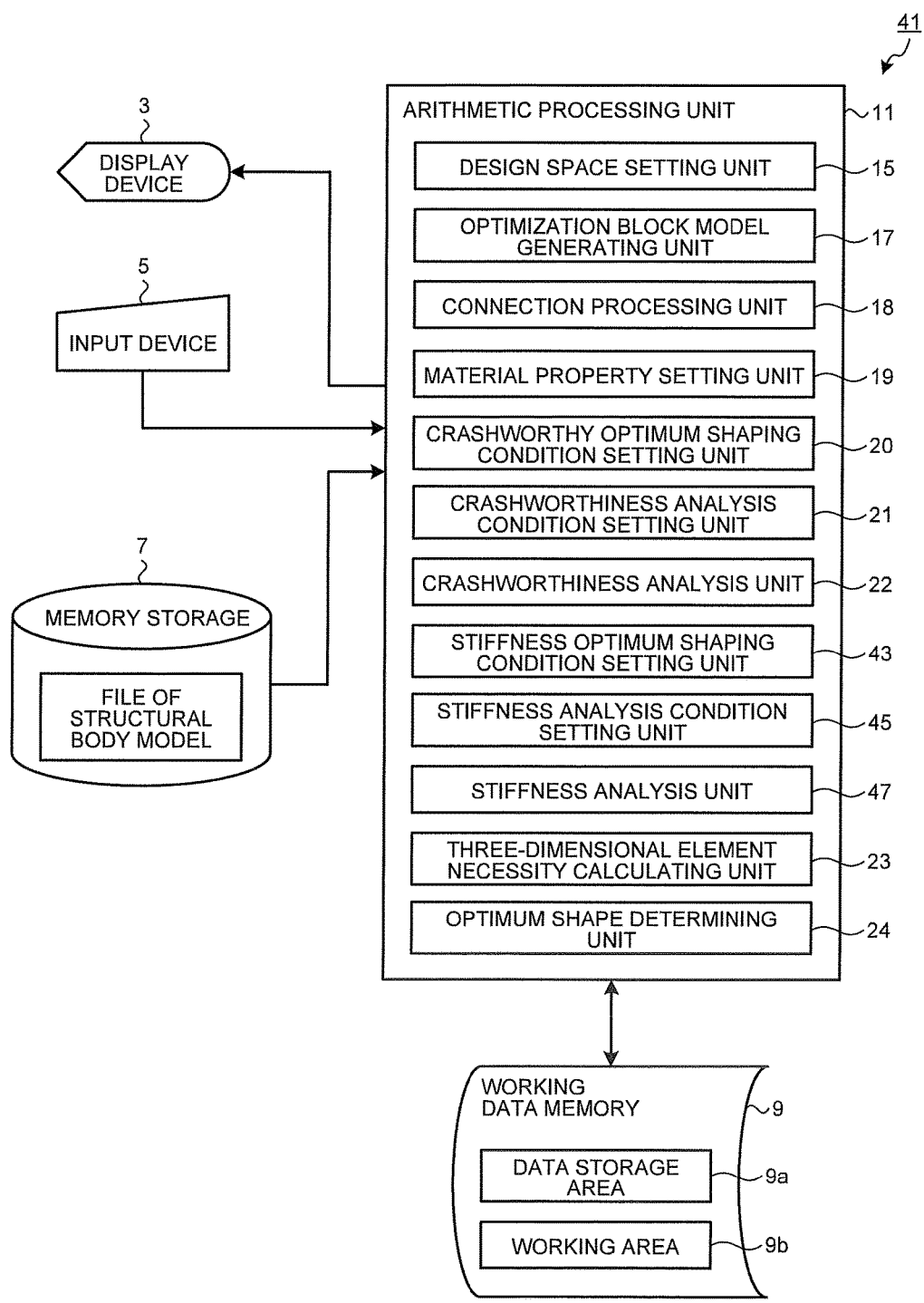
FIG. 15 is a block diagram illustrating an example of an apparatus for analysis of shape optimization according to a modified example of the first example.

In the above description, optimization for the crashworthiness of a structural body is performed and has been described, but optimization for the crashworthiness and the stiffness may be performed with respect to a structural body by further considering the stiffness. FIG. 15 is a block diagram exemplifying a configuration of an apparatus for analysis of shape optimization according to a modified example of the first example. When optimization for the crashworthiness and the stiffness of a structural body is performed, an apparatus for analysis of shape optimization 41 according to this modified example is configured to have, as illustrated in FIG. 15, in addition to the above described configuration of the apparatus for analysis of shape optimization 1 according to the first example: a stiffness optimum shaping condition setting unit 43 that sets a condition (referred to as "stiffness optimum shaping condition") for the optimization block model 27, the condition being to find an optimum shape for the stiffness; a stiffness analysis condition setting unit 45 that sets a condition (referred to as "stiffness analysis condition") to perform a stiffness analysis on the structural body model 13, to which the optimization block model 27 has been connected; and a stiffness analysis unit 47 that executes, based on the set stiffness optimum shaping condition and the stiffness analysis condition, the stiffness analysis on the optimization block model 27. In FIG. 15, the same signs are appended to components that are the same as those of the apparatus for analysis of shape optimization 1. Further, examples of the stiffness optimum shaping condition include objective conditions and constraint conditions. Examples of the stiffness analysis condition include a load constraint condition.

The stiffness optimum shaping condition setting unit 43 sets, similarly to the crashworthy optimum shaping condition setting unit 20, an objective condition and a constraint condition input by the input device 5, as stiffness optimum shaping conditions for the optimization block model 27. Examples of this objective condition include maximizing the stiffness, minimizing the displacement, and minimizing the stress. Examples of this constraint condition include the material volume fraction and displacement of an arbitrary portion.

Figure 16:
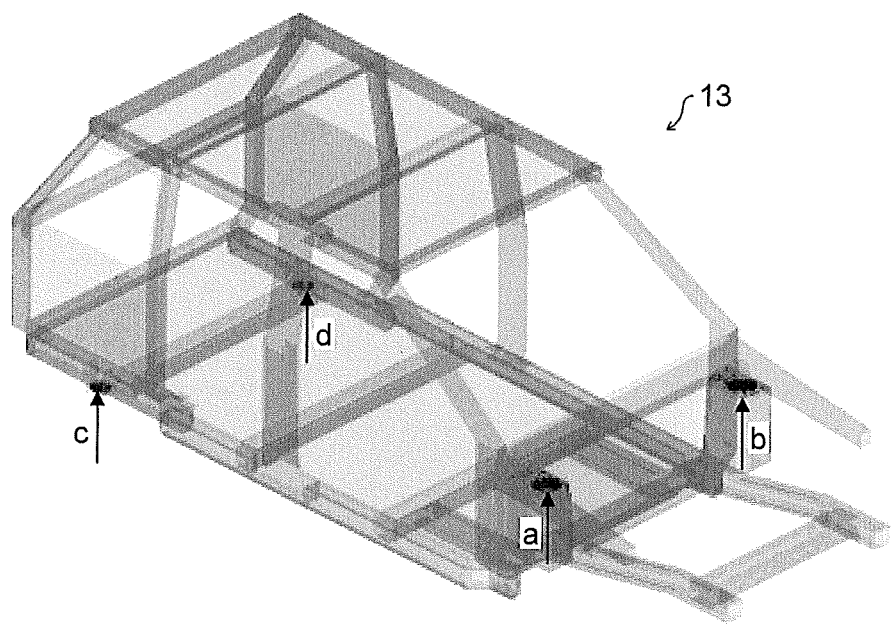
FIG. 16 is an explanatory diagram illustrating an example of a stiffness analysis condition set in the modified example of the first example.

The stiffness analysis condition setting unit 45 sets the load constraint condition input by the input device 5, as a stiffness analysis condition, for the structural body model 13, with which the optimization block model 27 has been connected. If, for example, the maximum stiffness of the optimization block model 27 for when a load to twist the structural body model 13 acts on the structural body model 13 is to be calculated, as illustrated in FIG. 16, the stiffness analysis condition setting unit 45 sets four positions "a", "b", "c", and "d" of the automotive body, which is an example of the structural body model 13, and sets a condition for constraining three of these positions and applying a load to the remaining one position, as the load constraint condition of the structural body model 13.

Based on the stiffness optimum shaping conditions and the stiffness analysis condition set as described above, the stiffness analysis unit 47 executes the stiffness analysis on the optimization block model 27. The three-dimensional element necessity calculating unit 23 of the apparatus for analysis of shape optimization 41 according to this modified example has a function of calculating information related to necessity of each three-dimensional element of the optimization block model 27 for the crashworthiness and the stiffness thereof when the stiffness analysis unit 47 performs the stiffness analysis. Therefore, the three-dimensional element necessity calculating unit 23 according to this modified example respectively calculates information related to necessity of each three-dimensional element in the optimization block model 27 for both of when the crashworthiness analysis unit 22 performs the crashworthiness analysis and when the stiffness analysis unit 47 performs the stiffness analysis.

Further, in this modified example, the optimum shape determining unit 24 is configured to comprehensively determine, based on the information related to necessity of each three-dimensional element calculated when the crashworthiness analysis was performed and the information related to necessity of each three-dimensional element calculated when the stiffness analysis was performed, an optimum shape for the crashworthiness and the stiffness. For example, if the information related to necessity of each three-dimensional element is an element density of each three-dimensional element, the optimum shape determining unit 24 finds, per each three-dimensional element corresponding to the optimization block model 27 used in the crashworthiness analysis and per each three-dimensional element corresponding to the optimization block model 27 used in the stiffness analysis, an average value of the element density, and determines, based on the average value, an element to be deleted. As a result, the optimum shape determining unit 24 is able to determine, based on the result of the crashworthiness analysis and the result of the stiffness analysis, an overall optimum shape of the optimization block model 27.

Figure 17:
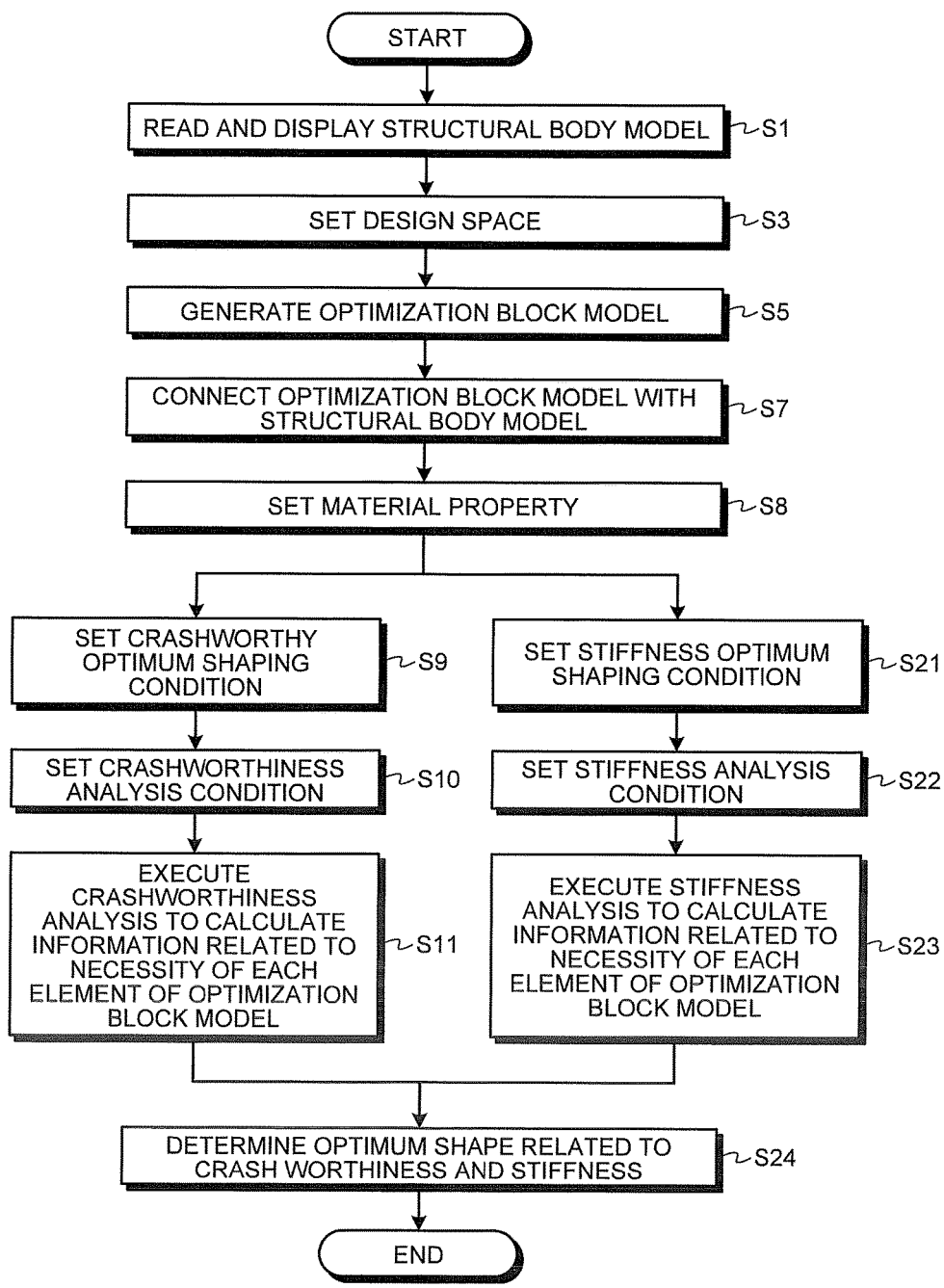
FIG. 17 is a flow chart illustrating a flow of processing by the apparatus for analysis of shape optimization illustrated in FIG. 15.

Next, a flow of a process for executing analysis according to this modified example by using the apparatus for analysis of shape optimization 41 having the above described configuration will be described based on a flow chart illustrated in FIG. 17. Of procedural steps illustrated in FIG. 17, Steps S1 to S11 are the same as those described by using the flow chart of FIG. 12, and thus description thereof will be omitted. In this modified example, after the optimization block model 27 and the structural body model 13 are connected together at Step S7, material properties are set for the optimization block model 27 at Step S8, and thereafter, processing of Steps S9 to S11 is separately performed concurrently with later described processing of Steps S21 to S23.

After connecting the optimization block model 27 and the structural body model 13 together at Step S7, the apparatus for analysis of shape optimization 41 of the computer sets a material property for the optimization block model 27 at Step S8, and thereafter sets stiffness optimum shaping conditions for finding an optimum shape for the stiffness, for the optimization block model 27 (S21). Next, the apparatus for analysis of shape optimization 41 sets a stiffness analysis condition for performing the stiffness analysis on the structural body model 13, to which the optimization block model 27 has been connected (S22).

Next, the apparatus for analysis of shape optimization 41 of the computer executes, based on the set stiffness optimum shaping conditions and the stiffness analysis condition, the stiffness analysis on the optimization block model 27, and calculates information related to necessity of each three-dimensional element of the optimization block model 27 for the stiffness (S23). Thereafter, the apparatus for analysis of shape optimization 41 determines, based on a result of the calculation of the three-dimensional element necessity calculation step found by performing the crashworthiness analysis at Step S11 and a result of the calculation of the three-dimensional element necessity calculation step found by performing the stiffness analysis at Step S23, an optimum shape of the optimization block model 27 for the crashworthiness and the stiffness (S24). In this modified example, the three-dimensional element necessity calculation step for a case where the stiffness analysis is executed, which is Step S23, is a different arithmetic processing step from the three-dimensional element necessity calculation step for a case where the crashworthiness analysis is executed, which is Step S11.

As described above, in the apparatus for analysis of shape optimization 41 according to this modified example, the stiffness analysis is performed on the structural body model 13, to which the optimization block model 27 has been connected, and thus load transmission from the connected portion 29 with the structural body model 13 to the optimization block model 27 is properly achieved like the case for crashworthiness analysis. Therefore, information related to necessity of each three-dimensional element of the structural body model 13 is able to be calculated accurately with respect to both the crash worthiness and the stiffness. Therefore, an optimum shape determined based on this information is also accurate.

Second Example

This second example relates to another mode of the optimization block model generating unit 17, and generation of an optimization block model is performed by: setting nodes in a connected portion with the two-dimensional elements or three-dimensional elements forming the structural body model 13; using hexahedral three-dimensional elements as the three-dimensional elements forming the optimization block model 27; and stacking the three-dimensional elements along a plane including the nodes set in the connected portion. Hereinafter, specific description will be made with reference to the drawings.

Figure 18:
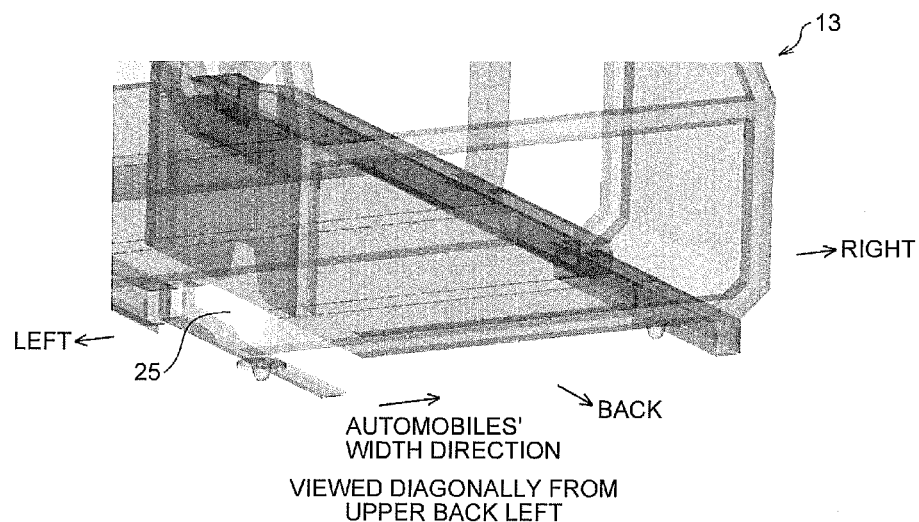
FIG. 18 is an explanatory diagram of a design space according to a second example.

FIG. 18 illustrates a state where the design space 25 has been set in a portion of a rear side member of the structural body model 13 representing the automotive body. As illustrated in FIG. 18, in this example, what is not parallel with a reference axis plane exists at a connected position between the structural body model 13 formed of two-dimensional elements and three-dimensional elements of the optimization block model 27 illustrated in later described FIG. 20. This second example is to be applied to such a case.

Figure 19:
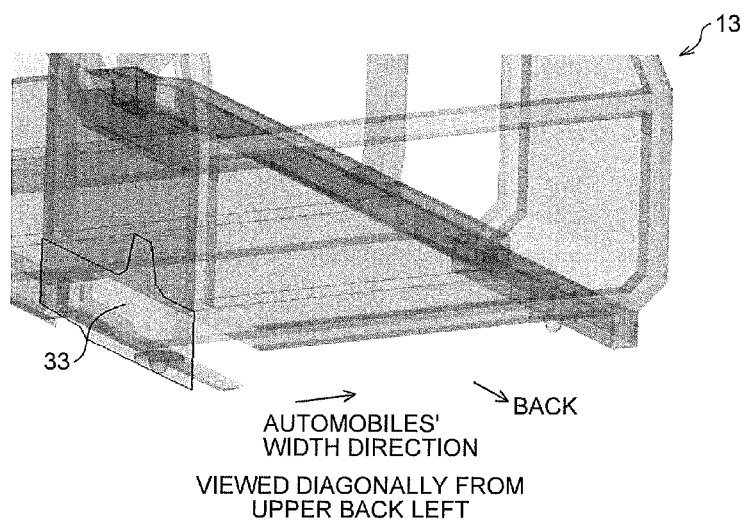
FIG. 19 is an explanatory diagram of a method of generating an optimization block model according to the second example.

The optimization block model generating unit 17 according to this second example also has an optimization block model generating function described below, in addition to the above described optimization block model generating function according to the first example. Specifically, the optimization block model generating unit 17 generates, as illustrated in FIG. 19, a reference plane 33 that becomes a reference for generating the optimization block model 27, with a sheet element, by joining with straight lines nodes present at a part where the structural body model 13 has been deleted on a lateral surface of the automotive body. When the reference plane 33 has been generated, the optimization block model generating unit 17 generates the optimization block model 27 by pushing out the reference plane 33 in the automobile's width direction to be integrated by node sharing.

Figure 20:
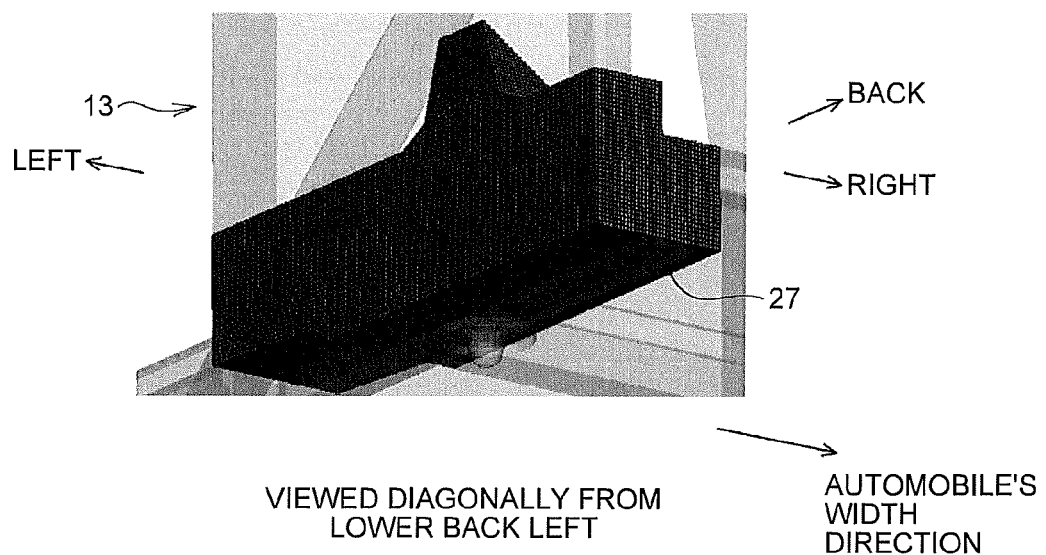
FIG. 20 is an explanatory diagram illustrating the optimization block model generated according to the second example.
Figure 21A:
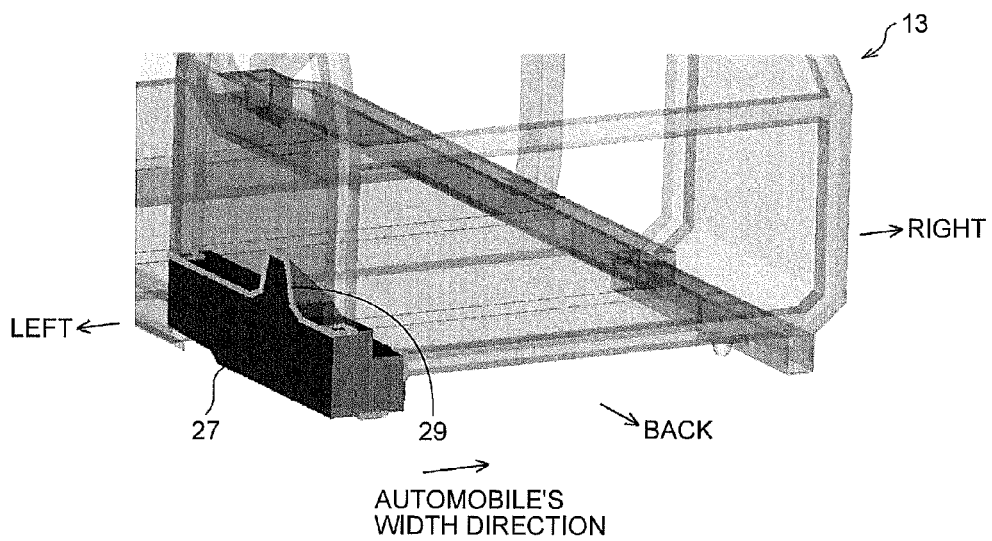
FIG. 21A is an explanatory diagram illustrating a connected portion of the optimization block model generated according to the second example.
Figure 21B:
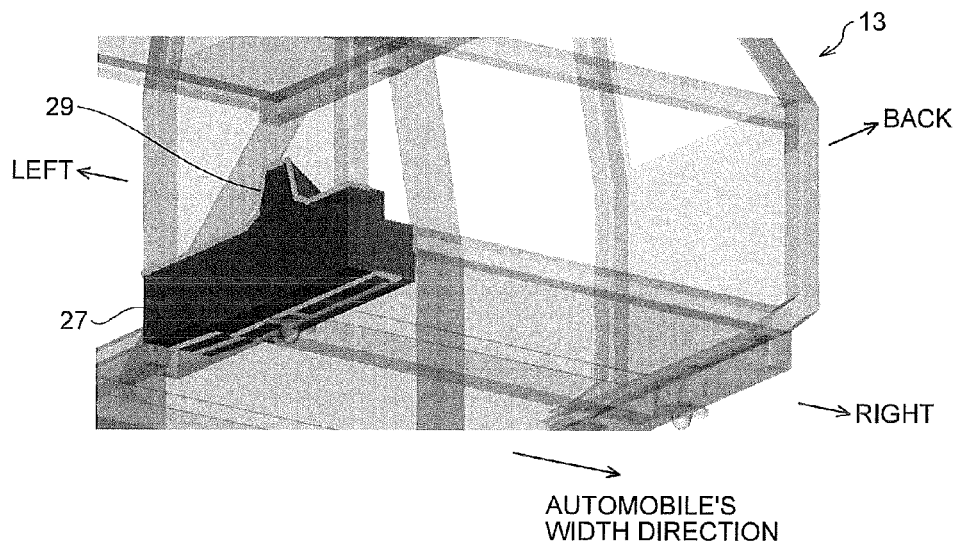
FIG. 21B is a view of the optimization block model illustrated in FIG. 21A as viewed from a different angle.

A state where the optimization block model 27 has been generated in this second example is illustrated in FIGS. 20, 21A, and 21B. FIG. 20 illustrates an enlarged view of the generated optimization block model 27. FIGS. 21A and 21B illustrate the connected portion 29 in the optimization block model 27. FIG. 21B illustrates the optimization block model 27 as viewed from an angle different from that in FIG. 21A. As described above, the optimization block model generating unit 17 generates the reference plane 33 and generates the optimization block model 27 by using this reference plane 33. As a result, there is an effect that a slanted part of the connected portion 29 between the optimization block model 27 and structural body model 13 becomes smoothly straight-lined. Accordingly, a connected state between the optimization block model 27 and the structural body model 13 (automotive body) becomes smooth, and as a result, an effect of load transmission between the optimization block model 27 and the structural body model 13 becoming accurate is achieved.

Figure 22:
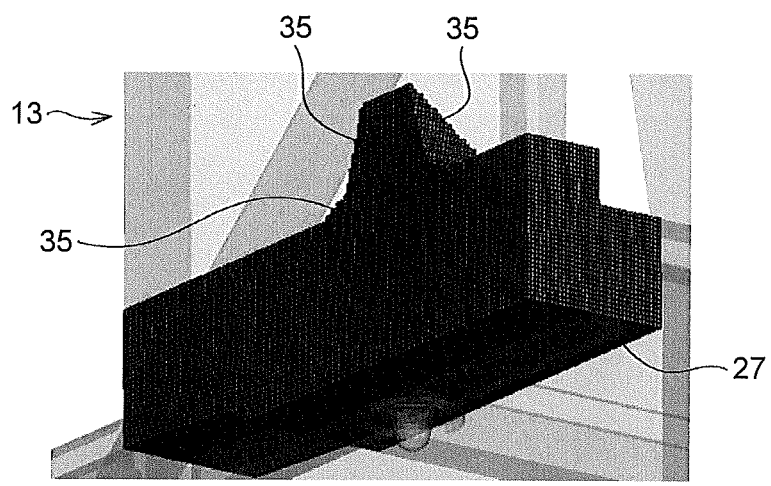
FIG. 22 is an explanatory diagram of a state where the optimization block model has been generated by the method of the first example as a comparative example for the method of generating the optimization block model according to the second example.
Figure 23A:
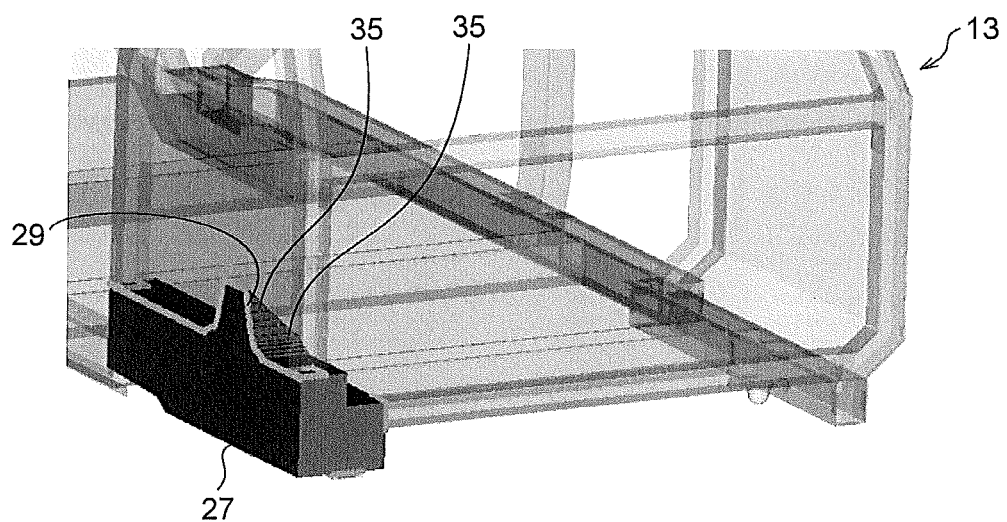
FIG. 23A is a diagram illustrating a state of the optimization block model and connected portion according to the comparative example for the second example.
Figure 23B:
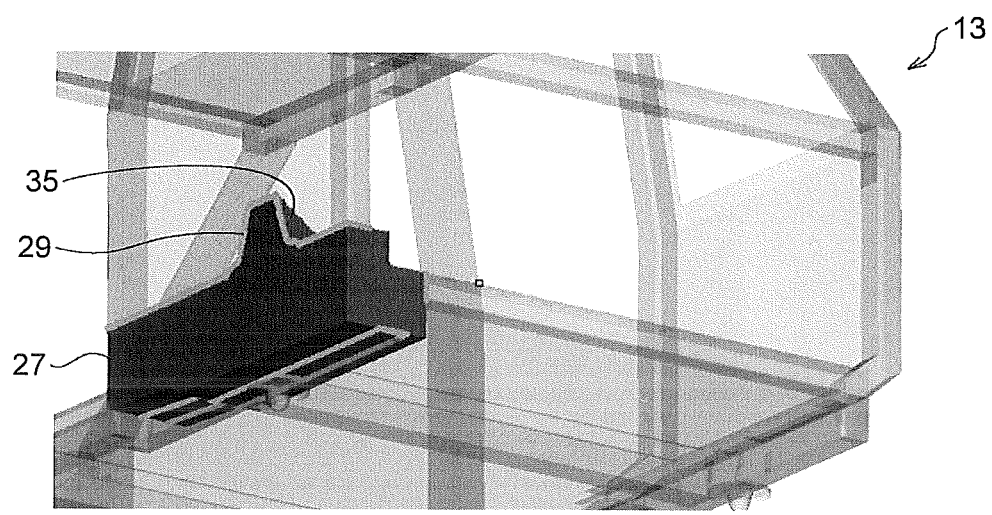
FIG. 23B is a view of the optimization block model according to the comparative example illustrated in FIG. 23A as viewed from a different angle.

As a comparative example for this second example, similarly to the first example, an example in which the optimization block model 27 has been generated without generating the reference plane 33 beforehand is illustrated in FIGS. 22, 23A, and 23B. FIG. 22 is an enlarged view of the optimization block model 27 generated in the comparative example. FIGS. 23A and 23B illustrate the connected portion 29 in the optimization block model 27. FIG. 23B illustrates the optimization block model 27 of the comparative example as viewed from an angle different from that in FIG. 23A. In the comparative example illustrated in FIGS. 22, 23A, and 23B, as compared to the optimization block model 27 and connected portion 29 according to the second example illustrated in FIGS. 20, 21A, and 21B, steps 35 are formed in the slanted part and the optimization block model 27 and connected portion 29 of the comparative example are not smooth.

According to the second example, even if the shape of the optimization block model 27 has a slope, the connected state between the optimization block model 27 and the structural body model 13 (automotive body) becomes smooth and, as a result, transmission of a load between the optimization block model 27 and the structural body model 13 becomes accurate.

Third Example

In the above described first and second examples, as the process of generating the optimization block model 27 by the optimization block model generating unit 17, the example in which the optimization block model 27 has been generated with a single body has been described, but in this third example, the optimization block model generating unit 17 may form the optimization block model 27 with a plurality of blocks formed of three-dimensional elements and generate the optimization block model 27 by connecting these plurality of blocks by using a rigid body element, a beam element, or a two-dimensional element. Hereinafter, a process of generating the optimization block model 27 according to this third example will be described specifically.

Figure 24:
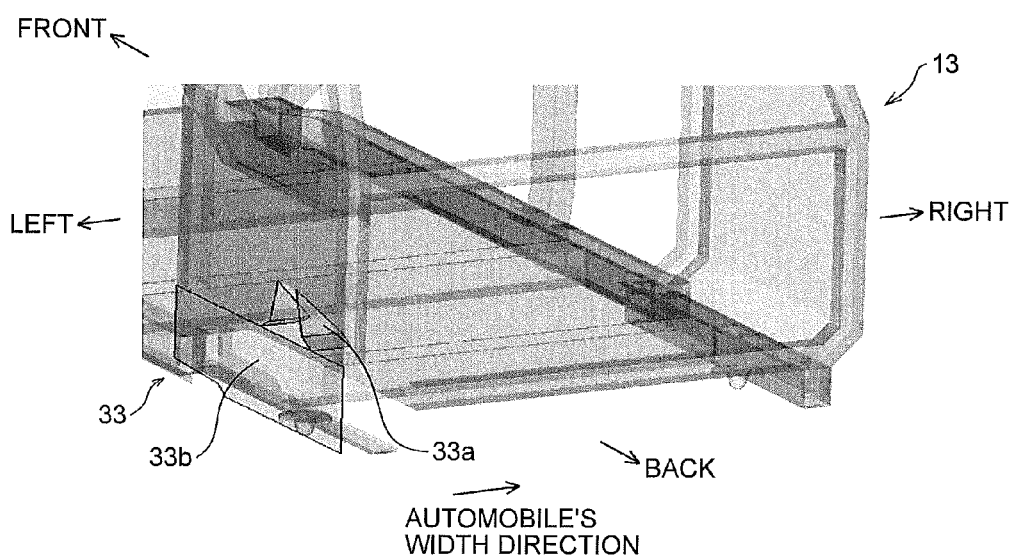
FIG. 24 is an explanatory diagram illustrating setting of a design space in a method of generating an optimization block model according to a third example.
Figure 25A:
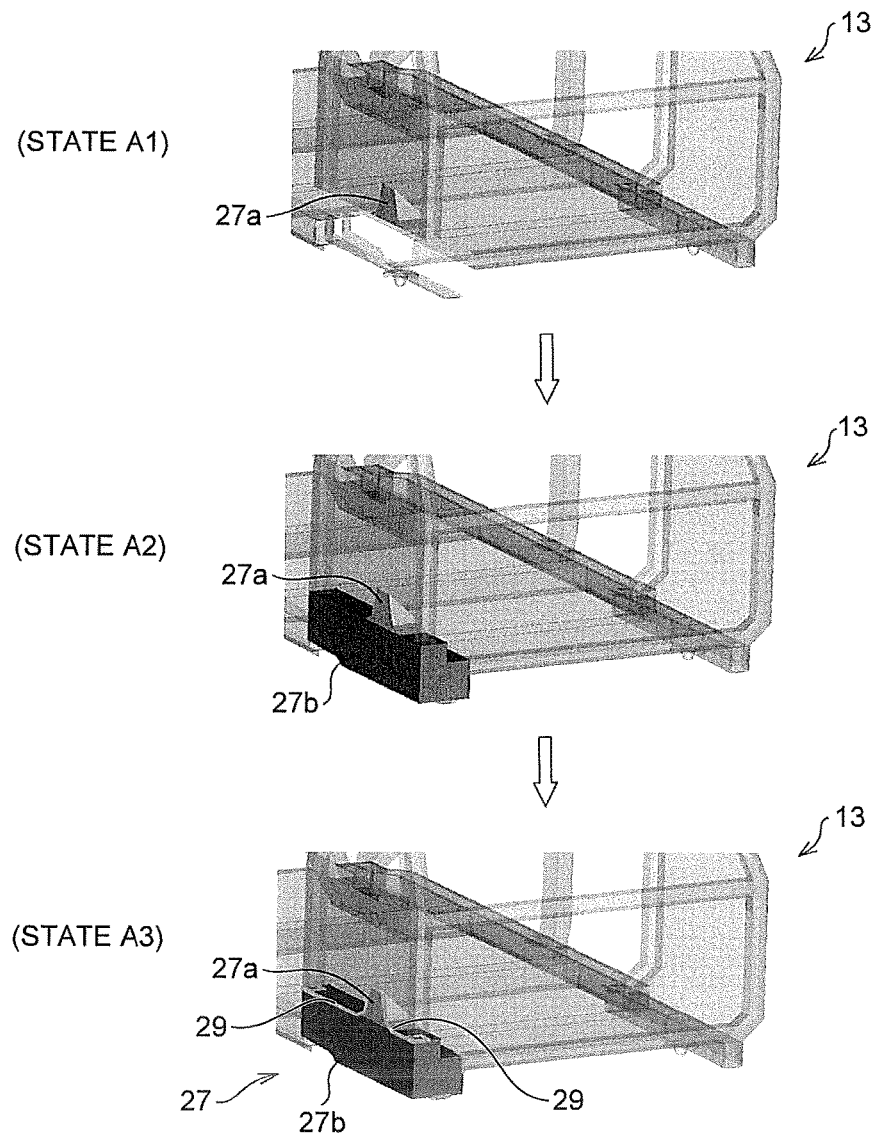
FIG. 25A is an explanatory diagram illustrating the method of generating the optimization block model according to the third example.
Figure 25B:
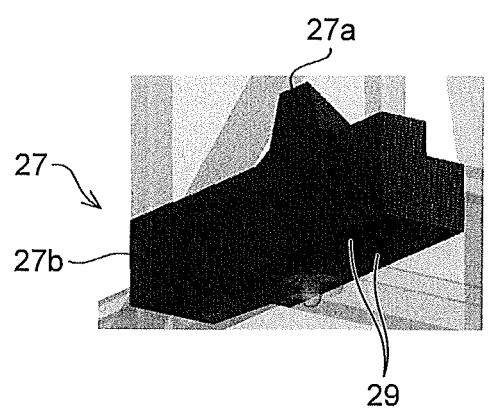
FIG. 25B is a view of the optimization block model illustrated in FIG. 25A as viewed from a different angle.

FIGS. 24, 25A, and 25B are explanatory diagrams of a method of generating the optimization block model according to this third example. FIG. 24 is an explanatory diagram illustrating a reference plane for optimization block model generation according to the third example. FIG. 25A is a diagram illustrating a state where the optimization block model according to the third example is generated. FIG. 25B is a view of the optimization block model illustrated in FIG. 25A as viewed from a different angle. The optimization block model generating unit 17 also has an optimization block model generating function according to this third example, in addition to the above described optimization block model generating functions according to the first and second examples. In this third example, the optimization block model generating unit 17 uses the method of generating the reference plane 33 described in the second example and generates the optimization block model 27 with a plurality of blocks.

Specifically, the optimization block model generating unit 17 first generates a plurality of independent reference planes 33a and 33b in the design space 25 illustrated in FIG. 18. Next, the optimization block model generating unit 17 pushes out the upper and triangular reference plane 33a illustrated in FIG. 24 in the front-back direction of the automobile to generate an upper block 27a, which is a triangular prism portion as illustrated with a state A1 of FIG. 25A. Subsequently, the optimization block model generating unit 17 pushes out the lower reference plane 33b illustrated in FIG. 24 in the automobile's width direction to generate a lower block 27b as illustrated with a state A2 of FIG. 25A. Thereafter, the optimization block model generating unit 17 sequentially connects, with the connected portion 29, the generated blocks together, as well as the optimization block model 27 and the structural body model 13 (automotive body) together, the optimization block model 27 being a connected body of these upper block 27a and lower block 27b (see a state A3 of FIGS. 25A and 25B).

As described above, in this third example, by generating the optimization block model 27 through division into a plurality of blocks, the optimization block model 27 is able to be generated, not only in the design space 25 formed of a block of a simple shape such as a cuboid, but also in the design space 25, which is not of a simple shape, for example, the design space 25 formed of a block of a complex shape or a block including a slope.

Further, by generating the optimization block model 27 through division into a plurality of blocks, the optimization block model 27 is able to be formed with a smooth surface. Thereby, the connection between the optimization block model 27 and the structural body model 13 is able to be made smooth and as a result, load transmission between the optimization block model 27 and the structural body model 13 is able to be achieved accurately.

In the above described third example, any of the upper block 27a and lower block 27b may be generated first, and the order of the connection between these blocks (the upper block 27a and the lower block 27b) and the connection between the upper block 27a or lower block 27b with the automotive body is not particularly limited and any of these connections may be performed first.

Further, in this third example, since optimization basically targets a space where nodes are shared, connection of blocks is preferably performed such that the connected area is equal to or less than 20%.

Further, this disclosure is not limited by the above described first to third examples, and modified example or working example, and my apparatus and methods include those configured by combining as appropriate any of the above described components. For example, a portion of the structural body model to be optimized is not limited to the B-pillar or rear side member of an automotive body, but may be a desired portion of an automotive body. Further, a method and an apparatus for analysis of shape optimization may perform the process of setting the stiffness optimum shaping conditions, the process of setting the stiffness analysis condition, and the stiffness analysis processing, which are described in the modified example of the first example, to execute the process of calculating information related to necessity of each three-dimensional element of the optimization block model for the stiffness and the process of determining, based on a result of this calculation, an optimum shape for the stiffness, without performing the above described process of setting the crashworthy optimum shaping conditions, process of setting the crashworthiness analysis condition, and the crashworthiness analysis. In this case, the apparatus for analysis of shape optimization may not include the above described crashworthy optimum shaping condition setting unit, the crashworthiness analysis condition setting unit, and the crashworthiness analysis unit. Further, the method and the apparatus for analysis of shape optimization may be those obtained by combining, as appropriate, the above described second and third examples with the modified example of the first example. Furthermore, all other examples, working examples, operation techniques, and the like made by those skilled in the art or the like based on the above described examples are included in this disclosure.

INDUSTRIAL APPLICABILITY

As described above, a method and an apparatus for analysis of shape optimization are useful for optimization of a structural body such as an automotive body, and in particular are suitable for a method and an apparatus for analysis of shape optimization that realize both improvement in stiffness and crash worthiness of the structural body and weight reduction of the structural body.

The invention claimed is:

1. A method for analysis of shape optimization in which a computer executes optimization of a portion forming a structural body model with a two-dimensional element or a three-dimensional element, the method executed by the computer, and comprising:
   a design space setting step of setting, as a design space, a portion to be optimized in the structural body model;
   an optimization block model generating step of generating, in the set design space, an optimization block model formed of three-dimensional elements and that performs an analysis processing of optimization;
   a connection processing step of connecting the generated optimization block model with the structural body model;
   a material property setting step of setting a material property for the optimization block model;
   a crashworthy optimum shaping condition setting step of setting a crashworthy optimum shaping condition for the optimization block model, the crashworthy optimum shaping condition being a condition that finds an optimum shape for a crashworthiness;
   a crashworthiness analysis condition setting step of setting a crashworthiness analysis condition for the structural body model with which the optimization block model has been connected, the crashworthiness analysis condition being a condition that performs a crashworthiness analysis;
   a three-dimensional element necessity calculation step of executing, based on the set crashworthy optimum shaping condition and the crashworthiness analysis condition, the crashworthiness analysis on the optimization block model, and calculating information related to necessity of each of the three-dimensional elements of the optimization block model for the crashworthiness;
   an optimum shape determining step of determining, based on a result of the calculation, an optimum shape for the crashworthiness,
   utilizing the analysis of shape optimization for configuring optimization of the structural body formed from a thin sheet, and
   displaying the structural body model based on the optimum shape determining step,
   wherein in the optimization block model generating step,
      when the computer or an operator selects a plane having the maximum area of the design space having a size that fits in the set design space, along a peripheral surface where the design space has been set in the structural body model,
      the computer pushes out the three-dimensional elements in parallel with the plane having the maximum area of the design space such that the three-dimensional elements and the design space are to be integrated by node sharing, and subdivides the three-dimensional elements such that the three-dimensional elements have at least one pair of sides parallel to each other, and
   the optimization block model is generated by:
      setting nodes in a connected portion with the two-dimensional elements or the three-dimensional elements forming the structural body model; and
      stacking the three-dimensional elements along a plane including the nodes set in the connected portion.

2. The method according to claim 1, further comprising:
   a stiffness optimum shaping condition setting step of setting a stiffness optimum shaping condition for the optimization block model, the stiffness optimum shaping condition being a condition that finds an optimum shape for a stiffness;
   a stiffness analysis condition setting step of setting a stiffness analysis condition for the structural body model with which the optimization block model has been connected, the stiffness analysis condition being a condition that performs a stiffness analysis; and
   a three-dimensional element necessity calculation step of executing, based on the set stiffness optimum shaping condition and the stiffness analysis condition, the stiffness analysis on the optimization block model, and calculating information related to necessity of each of the three-dimensional elements of the optimization block model for crashworthiness and the stiffness,
   wherein the optimum shape determining step determines an optimum shape for the crashworthiness and the stiffness, based on a result of the calculation of the three-dimensional element necessity calculation step when the crashworthiness analysis has been executed and a result of the calculation of the three-dimensional element necessity calculation step when the stiffness analysis has been executed.

3. The method according to claim 1, wherein the crashworthiness analysis condition setting step sets, as a crashworthiness load, a load obtained by performing a crashworthiness analysis on the structural body model beforehand.

4. The method according to claim 1, wherein the material property setting step sets, if a part where the optimization block model has been connected with in the structural body model is formed of a two-dimensional element, a Young's modulus of the three-dimensional elements of the optimization block model to a Young's modulus lower than a Young's modulus of the two-dimensional element.

5. The method according to claim 1, wherein the material property setting step sets, if a part where the optimization block model has been connected with in the structural body model is formed of a two-dimensional element, stress of a stress-strain curve for the three-dimensional elements of the optimization block model to stress lower than stress of a stress-strain curve for the two-dimensional element.

6. The method according to claim 1, wherein the three-dimensional elements forming the optimization block model are each formed of a three-dimensional element that is a polyhedron having five or more sides and eight or less sides and that has at least one pair of sides parallel to each other.

7. The method according to claim 1, wherein the optimization block model is further generated by:
   using, as the three-dimensional elements forming the optimization block model, hexahedral three-dimensional elements.

8. The method according to claim 1, wherein the optimization block model is formed of a plurality of block bodies formed of three-dimensional elements, and is formed by connecting the plurality of block bodies by using a rigid body element, a beam element, or a two-dimensional element.

9. The method according to claim 1, wherein discretization is performed with an optimization parameter in optimization calculation by numerical analysis.

10. A method for analysis of shape optimization in which a computer executes optimization of a portion forming a structural body model with a two-dimensional element or a three-dimensional element, the method executed by the computer, and comprising:
- a design space setting step of setting, as a design space, a portion to be optimized in the structural body model;
- an optimization block model generating step of generating, in the set design space, an optimization block model formed of three-dimensional elements and that performs an analysis processing of optimization;
- a connection processing step of connecting the generated optimization block model with the structural body model;
- a material property setting step of setting a material property for the optimization block model;
- a stiffness optimum shaping condition setting step of setting a stiffness optimum shaping condition for the optimization block model, the stiffness optimum shaping condition being a condition that finds an optimum shape for a stiffness;
- a stiffness analysis condition setting step of setting a stiffness analysis condition for the structural body model with which the optimization block model has been connected, the stiffness analysis condition being a condition that performs a stiffness analysis;
- a three-dimensional element necessity calculation step of executing, based on the set stiffness optimum shaping condition and the stiffness analysis condition, the stiffness analysis on the optimization block model, and calculating information related to necessity of each of the three-dimensional elements of the optimization block model for the stiffness;
- an optimum shape determining step of determining, based on a result of the calculation, an optimum shape for the stiffness,
- utilizing the analysis of shape optimization for configuring optimization of the structural body formed from a thin sheet, and
- displaying the structural body model based on the optimum shape determining step,
- wherein in the optimization block model generating step,
  - when the computer selects a plane having the maximum area of the design space having a size that fits in the set design space, along a peripheral surface where the design space has been set in the structural body model,
  - the computer pushes out the three-dimensional elements in parallel with the plane having the maximum area of the design space such that the three-dimensional elements and the design space are to be integrated by node sharing, and subdivides the three-dimensional elements such that the three-dimensional elements have at least one pair of sides parallel to each other, and
  - the optimization block model is generated by:
    - setting nodes in a connected portion with the two-dimensional elements or the three-dimensional elements forming the structural body model; and
    - stacking the three-dimensional elements along a plane including the nodes set in the connected portion.

11. The method according to claim 10, wherein the material property setting step sets, if a part where the optimization block model has been connected with in the structural body model is formed of a two-dimensional element, a Young's modulus of the three-dimensional elements of the optimization block model to a Young's modulus lower than a Young's modulus of the two-dimensional element.

12. The method according to claim 10, wherein the material property setting step sets, if a part where the optimization block model has been connected with in the structural body model is formed of a two-dimensional element, stress of a stress-strain curve for the three-dimensional elements of the optimization block model to stress lower than stress of a stress-strain curve for the two-dimensional element.

13. The method according to claim 10, wherein the three-dimensional elements forming the optimization block model are each formed of a three-dimensional element that is a polyhedron having five or more sides and eight or less sides and that has at least one pair of sides parallel to each other.

14. The method according to claim 10, wherein the optimization block model is further generated by:
- using, as the three-dimensional elements forming the optimization block model, hexahedral three-dimensional elements.

15. The method according to claim 10, wherein the optimization block model is formed of a plurality of block bodies formed of three-dimensional elements, and is formed by connecting the plurality of block bodies with a rigid body element, a beam element, or a two-dimensional element.

16. The method according to claim 10, wherein discretization is performed with an optimization parameter in optimization calculation by numerical analysis.

17. An apparatus for analysis of shape optimization that performs, by a computer, an optimization calculation by numerical analysis of a shape of a portion of a structural body model formed with a two-dimensional element, or both of the two-dimensional element and a three-dimensional elements, the apparatus comprising a display device and a processing unit and a memory that:
- sets, as a design space, a portion to be optimized in a part of the structural body model;
- generates, in the set design space, an optimization block model formed of three-dimensional elements and performs an analysis processing of optimization, wherein
  - when the computer selects a plane having the maximum area of the design space having a size that fits in the set design space, along a peripheral surface where the design space has been set in the structural body model,
  - the computer pushes out the three-dimensional elements in parallel with the plane having the maximum area of the design space such that the three-dimensional elements and the design space are to be integrated by node sharing, and subdivides the three-dimensional elements such that the three-dimensional elements have at least one pair of sides parallel to each other;
- performs a processing of connecting the generated optimization block model with the structural body model;
- sets a material property for the optimization block model;
- sets a crashworthy optimum shaping condition for the optimization block model, the crashworthy optimum shaping condition being a condition that finds an optimum shape for a crashworthiness;
- sets a crashworthiness analysis condition for the structural body model with which the optimization block model has been connected, the crashworthiness analysis condition being that performs a crashworthiness analysis;
- executes, based on the set crashworthy optimum shaping condition and the crashworthiness analysis condition, the crashworthiness analysis on the optimization block model;

calculates information related to necessity of each of the three dimensional elements of the optimization block model for the crashworthiness when the crashworthiness analysis is performed;

determines, based on a result of the calculation, an optimum shape for the crashworthiness;

utilizing the analysis of shape optimization for configuring optimization of the structural body formed from a thin sheet, and the display device displays the structural body model based on the optimum shape determining step, wherein the optimization block model is generated by:
setting nodes in a connected portion with the two-dimensional elements or the three-dimensional elements forming the structural body model; and
stacking the three-dimensional elements along a plane including the nodes set in the connected portion.

18. The apparatus according to claim 17, wherein the processing unit further:

sets a stiffness optimum shaping condition for the optimization block model, the stiffness optimum shaping condition being a condition that finds an optimum shape for a stiffness;

sets a stiffness analysis condition for the structural body model with which the optimization block model has been connected, the stiffness analysis condition being a condition that performs a stiffness analysis; and executes, based on the set stiffness optimum shaping condition and the stiffness analysis condition, the stiffness analysis on the optimization block model, calculates information related to necessity of each of the three dimensional elements of the optimization block model for the crashworthiness and performs the stiffness analysis, and determines, based on the information related to necessity of each of the three-dimensional elements calculated when the crashworthiness analysis was performed and information related to necessity of each of the three-dimensional elements calculated when the stiffness analysis was performed, an optimum shape for the crashworthiness and the stiffness.

19. The apparatus according to claim 17, wherein the processing unit sets, as a crashworthiness load, a load obtained by performing crashworthiness analysis on the structural body model beforehand.

20. The apparatus according to claim 17, wherein the processing unit sets, if a part where the optimization block model has been connected with in the structural body model is formed of a two-dimensional element, a Young's modulus of the three-dimensional elements of the optimization block model to a Young's modulus lower than a Young's modulus of the two-dimensional element.

21. The apparatus according to claim 17, wherein the processing unit sets, if a part where the optimization block model has been connected with in the structural body model is formed of a two-dimensional element, stress of a stress-strain curve for the three-dimensional elements of the optimization block model to stress lower than stress of a stress-strain curve for the two-dimensional element.

22. The apparatus according to claim 17, wherein the three-dimensional elements forming the optimization block model is each formed of a three-dimensional element that is a polyhedron having five or more sides and eight or less sides and that has at least one pair of sides parallel to each other.

23. The apparatus according to claim 17, wherein the processing unit further generates the optimization block model by:

using, as the three-dimensional elements forming the optimization block model, hexahedral three-dimensional elements.

24. The apparatus according to claim 17, wherein the processing unit forms the optimization block model with a plurality of blocks formed of three-dimensional elements, and generates the optimization block model by connecting the plurality of blocks by using a rigid body element, a beam element, or a two-dimensional element.

25. The apparatus according to claim 17, wherein the processing unit performs discretization with an optimization parameter in the optimization calculation by the numerical analysis.

26. The apparatus according to claim 17, wherein the processing unit performs the optimization calculation by topology optimization.

27. An apparatus for analysis of shape optimization that performs, by a computer, an optimization calculation by numerical analysis of a shape of a portion of a structural body model formed with a two-dimensional element, or both of the two-dimensional element and a three-dimensional element, the apparatus comprising a display device and a processing unit and a memory that:

sets, as a design space, a portion to be optimized in a part of the structural body model;

generates, in the set design space, an optimization block model formed of three-dimensional elements and performs an analysis processing of optimization, wherein
when the computer selects a plane having the maximum area of the design space having a size that fits in the set design space, along a peripheral surface where the design space has been set in the structural body model,
the computer pushes out the three-dimensional elements in parallel with the plane having the maximum area of the design space such that the three-dimensional elements and the design space are to be integrated by node sharing, and subdivides the three-dimensional elements such that the three-dimensional elements has at least one pair of sides parallel to each other;

performs a processing of connecting the generated optimization block model with the structural body model;

sets a material property for the optimization block model;

sets a stiffness optimum shaping condition for the optimization block model, the stiffness optimum shaping condition being a condition that finds an optimum shape for a stiffness;

sets a stiffness analysis condition for the structural body model with which the optimization block model has been connected, the stiffness analysis condition being a condition that performs a stiffness analysis;

executes, based on the set stiffness optimum shaping condition and the stiffness analysis condition, the stiffness analysis on the optimization block model;

calculates information related to necessity of each of the three dimensional elements of the optimization block model for the stiffness when the stiffness analysis is performed;

determines, based on a result of the calculation, an optimum shape for the stiffness;

utilizes the analysis of shape optimization for configuring optimization of the structural body formed from a thin sheet, and the display device displays the structural body model based on the optimum shape determining step,
wherein the optimization block model is generated by:
setting nodes in a connected portion with the two-dimensional elements or the three-dimensional elements forming the structural body model; and
stacking the three-dimensional elements along a plane including the nodes set in the connected portion.

28. The apparatus according to claim 27, wherein the processing unit sets, if a part where the optimization block model has been connected with in the structural body model is formed of a two-dimensional element, a Young's modulus of the three-dimensional elements of the optimization block model to a Young's modulus lower than a Young's modulus of the two-dimensional element.

29. The apparatus according to claim 27, wherein the processing unit sets, if a part where the optimization block model has been connected with in the structural body model is formed of a two-dimensional element, stress of a stress-strain curve for the three-dimensional elements of the optimization block model to stress lower than stress of a stress-strain curve for the two-dimensional element.

30. The apparatus according to claim 27, wherein the three-dimensional elements forming the optimization block model is each formed of a three-dimensional element that is a polyhedron having five or more sides and eight or less sides and that has at least one pair of sides parallel to each other.

31. The apparatus according to claim 27, wherein the processing unit further generates the optimization block model by:
using, as the three-dimensional elements forming the optimization block model, hexahedral three-dimensional elements.

32. The apparatus according to claim 27, wherein the processing unit forms the optimization block model with a plurality of blocks formed of three-dimensional elements, and generates the optimization block model by connecting the plurality of blocks by using a rigid body element, a beam element, or a two-dimensional element.

33. The apparatus according to claim 27, wherein the processing unit performs discretization with an optimization parameter in the optimization calculation by the numerical analysis.

34. The apparatus according to claim 27, wherein the processing unit performs the optimization calculation by topology optimization.

* * * * *